United States Patent
John et al.

(10) Patent No.: US 12,407,615 B2
(45) Date of Patent: Sep. 2, 2025

(54) METHODS AND APPARATUS FOR SESSION STEERING TO APPLICATION SERVERS

(71) Applicant: Huawei Technologies Co., Ltd., Shenzhen (CN)

(72) Inventors: Kaippallimalil Mathew John, Carrollton, TX (US); Khosrow Tony Saboorian, Plano, TX (US); Zhixian Xiang, Frisco, TX (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 231 days.

(21) Appl. No.: 17/981,068

(22) Filed: Nov. 4, 2022

(65) Prior Publication Data
US 2023/0096469 A1    Mar. 30, 2023

Related U.S. Application Data

(63) Continuation of application No. PCT/US2021/023322, filed on Mar. 19, 2021.

(60) Provisional application No. 63/019,754, filed on May 4, 2020.

(51) Int. Cl.
*H04L 47/20* (2022.01)
*H04L 45/74* (2022.01)
*H04L 47/2441* (2022.01)

(52) U.S. Cl.
CPC .............. *H04L 47/20* (2013.01); *H04L 45/74* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 2018/0192390 A1* | 7/2018 | Li | H04W 72/53 |
| 2019/0053117 A1* | 2/2019 | Bae | H04W 76/30 |
| 2019/0394833 A1* | 12/2019 | Talebi Fard | H04W 4/80 |
| 2020/0128503 A1* | 4/2020 | Li | H04W 4/60 |
| 2020/0267785 A1* | 8/2020 | Talebi Fard | H04L 45/04 |
| 2022/0007180 A1* | 1/2022 | Liao | H04L 67/14 |
| 2022/0141662 A1* | 5/2022 | Liao | H04W 12/37 726/1 |
| 2022/0159527 A1* | 5/2022 | Lee | H04W 8/24 |
| 2022/0312158 A1* | 9/2022 | Gonzalez | H04M 15/80 |

* cited by examiner

*Primary Examiner* — Eunsook Choi
(74) *Attorney, Agent, or Firm* — Slater Matsil, LLP

(57) ABSTRACT

A method includes receiving, by a control plane (CP) from an application function (AF), a traffic influence routing rule comprising a service address representing a destination address of a route to an application server, the traffic influence routing rule specifying a breakout rule for packets of a communicating device addressed to the application server; storing, by the CP, the traffic influence routing rule in a policy control function (PCF); and generating, by the CP, a traffic filter for packets of at least one traffic flow associated with the communicating device, the traffic filter directing packets of the at least one traffic flow that are addressed to the application server to the service address, the traffic filter being generated in accordance with the traffic influence routing rule.

33 Claims, 13 Drawing Sheets

METHODS AND APPARATUS FOR SESSION STEERING TO APPLICATION SERVERS

CROSS-REFERENCE TO RELATED APPLICATIONS

This application is a continuation of International Application No. PCT/US2021/023322, filed Mar. 19, 2021, entitled "Methods and Apparatus for Session Steering to Application Servers," which claims the benefit of U.S. Provisional Application No. 63/019,754, filed on May 4, 2020, entitled "Apparatus and Methods for PDU Session Steering for Edge Computing," applications of which are incorporated herein by reference in their entireties.

TECHNICAL FIELD

The present disclosure relates generally to methods and apparatus for digital communications, and, in particular embodiments, to methods and apparatus for session steering to application servers.

BACKGROUND

Fifth Generation (5G) networks that host edge computing (EC) sites close to the radio access network (RAN) may have a split packet data unit (PDU) session, where a default PDU session path is terminated at a central data network, and a local path is terminated closed to the access network (AN) or RAN. Routing to the local path uses a user plane function (UPF) that forwards to the local UPF PDU session anchor (PSA) if there is a match on forwarding rules configured during the setup of the PDU session. An example of such a UPF is the uplink classifier (ULCL) UPF.

EC services, as well as application services, typically use an anycast Internet protocol (IP) address that represents a service address. The availability of an application server (AS) is programmed in route controllers and advertised using a border gateway protocol (BGP) (or an interior gateway protocol (IGP)). This provides a scalable and resilient means for users to reach application servers.

The PDU session (or similarly, the network access) to edge application servers (EASs) deployed at the mobile edge spans from the user equipment (UE) to the UPF that selectively steers traffic to the local UPF-PSA. Because routes advertised by BGP, IGP, etc., are not known, the UPF will not be able to steer packets to the EASs unless the UPF is made aware of the application services at the edge. Therefore, there is a need for methods and apparatus for session steering with application servers.

SUMMARY

According to a first aspect, a method is provided. The method comprising: receiving, by a control plane (CP) from an application function (AF), a traffic influence routing rule comprising a service address representing a destination address of a route to an application server, the traffic influence routing rule specifying a breakout rule for packets of a communicating device addressed to the application server; storing, by the CP, the traffic influence routing rule in a Policy Control Function (PCF); and generating, by the CP, a traffic filter for packets of at least one traffic flow associated with the communicating device, the traffic filter directing packets of the at least one traffic flow that are addressed to the application server to the service address, the traffic filter being generated in accordance with the traffic influence routing rule.

In a first implementation form of the method according to the first aspect, the traffic influence routing rule comprising at least one of a traffic influence create rule, a traffic influence update rule, or a traffic influence delete rule.

In a second implementation form of the method according to the first aspect or any preceding implementation form of the first aspect, the traffic influence routing rule further comprising at least one gateway address associated with the service address.

In a third implementation form of the method according to the first aspect or any preceding implementation form of the first aspect, the traffic filter comprising the service address and the at least one gateway address.

In a fourth implementation form of the method according to the first aspect or any preceding implementation form of the first aspect, the traffic filter being stored in accordance with a network slice selection assistance information.

In a fifth implementation form of the method according to the first aspect or any preceding implementation form of the first aspect, further comprising sending, by the CP to the AF, a traffic influence routing rule response.

In a sixth implementation form of the method according to the first aspect or any preceding implementation form of the first aspect, the traffic filter being stored in a unified data repository (UDR).

In a seventh implementation form of the method according to the first aspect or any preceding implementation form of the first aspect, storing the traffic filter comprising updating an existing traffic filter with the traffic filter.

In an eighth implementation form of the method according to the first aspect or any preceding implementation form of the first aspect, the service address comprising an Internet Protocol address, a port address, and a protocol.

In a ninth implementation form of the method according to the first aspect or any preceding implementation form of the first aspect, further comprising generating, by the CP, information associated with the traffic filter.

In a tenth implementation form of the method according to the first aspect or any preceding implementation form of the first aspect, the information comprising a single network slice selection assistance information (S-NSSAI).

According to a second aspect, a method is provided. The method comprising: receiving, by a PCF, a traffic filter for packets of at least one traffic flow associated with a communicating device, the traffic filter comprising a traffic influence routing rule specifying a breakout rule for packets addressed to an application server; deriving, by the PCF, a network identifier associated with the traffic filter; and providing, by the PCF to a session management function (SMF), the network identifier and the traffic filter.

In a first implementation form of the method according to the second aspect, the network identifier comprising a data network access identifier (DNAI).

In a second implementation form of the method according to the second aspect or any preceding implementation form of the second aspect, the traffic filter comprising a service address and at least one gateway address.

In a third implementation form of the method according to the second aspect or any preceding implementation form of the second aspect, the traffic filter further comprising a network slice selection assistance information.

In a fourth implementation form of the method according to the second aspect or any preceding implementation form of the second aspect, providing the network identifier and the traffic filter comprising initiating a session management policy control service.According to a third aspect, a CP is provided. The CP comprising: a non-transitory memory storage comprising instructions; and one or more processors in communication with the memory storage, wherein the one or more processors execute the instructions to: receive, from an AF, a traffic influence routing rule comprising a service address representing a destination address as a route to an application server, the traffic influence routing rule specifying a breakout rule for packets of a communicating device addressed to the application server; store the traffic influence routing rule in a PCF; and generate a traffic filter for packets of at least one traffic flow associated with the communicating device, the traffic filter directing packets of the at least one traffic flow that are addressed to the application server to the service address, the traffic filter being generated in accordance with the traffic influence routing rule.

In a first implementation form of the CP according to the third aspect, the traffic influence routing rule comprising at least one of a traffic influence create rule, a traffic influence update rule, or a traffic influence delete rule.

In a second implementation form of the CP according to the third aspect or any preceding implementation form of the third aspect, the traffic influence routing rule further comprising at least one gateway address associated with the service address.

In a third implementation form of the CP according to the third aspect or any preceding implementation form of the third aspect, the traffic filter comprising the service address and the at least one gateway address.

In a fourth implementation form of the CP according to the third aspect or any preceding implementation form of the third aspect, the traffic filter being stored in accordance with a network slice selection assistance information.

In a fifth implementation form of the CP according to the third aspect or any preceding implementation form of the third aspect, further comprising sending, by the CP to the AF, a traffic influence routing rule response.

In a sixth implementation form of the CP according to the third aspect or any preceding implementation form of the third aspect, the traffic filter being stored in a UDR.

In a seventh implementation form of the CP according to the third aspect or any preceding implementation form of the third aspect, storing the traffic filter comprising updating an existing traffic filter with the traffic filter.

In an eighth implementation form of the CP according to the third aspect or any preceding implementation form of the third aspect, the service address comprising an Internet Protocol address, a port address, and a protocol.

In a ninth implementation form of the CP according to the third aspect or any preceding implementation form of the third aspect, further comprising generating, by the CP, information associated with the traffic filter.

In a tenth implementation form of the CP according to the third aspect or any preceding implementation form of the third aspect, the information comprising a S-NSSAI.

According to a fourth aspect, a NF is provided. The NF comprising: a non-transitory memory storage comprising instructions; and one or more processors in communication with the memory storage, wherein the one or more processors execute the instructions to: receive a traffic filter for packets of at least one traffic flow associated with a communicating device, the traffic filter comprising a traffic influence routing rule specifying a breakout rule for packets addressed to an application server; derive a network identifier associated with the traffic filter; and provide, to a SMF, the network identifier and the traffic filter.

In a first implementation form of the NF according to the fourth aspect, the network identifier comprising a DNAI.

In a second implementation form of the NF according to the fourth aspect or any preceding implementation form of the fourth aspect, the traffic filter comprising a service address and at least one gateway address.

In a third implementation form of the NF according to the fourth aspect or any preceding implementation form of the fourth aspect, the traffic filter further comprising a network slice selection assistance information.

In a fourth implementation form of the NF according to the fourth aspect or any preceding implementation form of the fourth aspect, providing the network identifier and the traffic filter comprising initiating a session management policy control service.

An advantage of a preferred embodiment is that knowledge of edge application services allows the user plane function (UPF), e.g., the uplink classifier (ULCL), to steer traffic to the UPF PDU session anchor (PSA) serving the edge location. Steering traffic to the UPF-PSA serving the edge location enables the selection of local application service servers, which reduces the costs and latencies associated with the routing.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
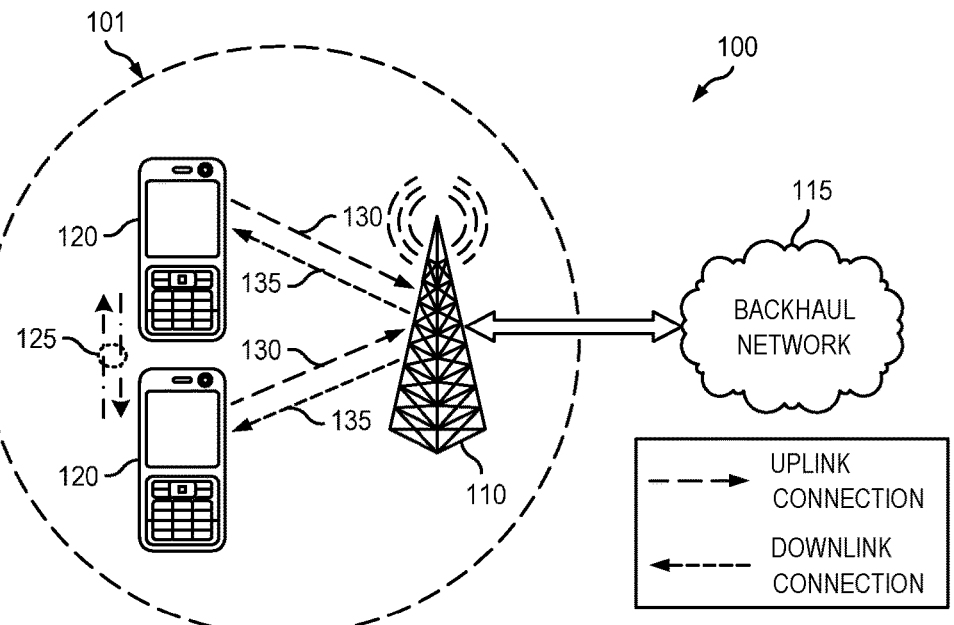
FIG. 1 illustrates a first example communications system.

FIG. 1 illustrates a first example communications system 100. Communications system 100 includes an access node 110, with coverage area 101, serving user equipments (UEs), such as UEs 120. Access node 110 is connected to a backhaul network 115 that provides connectivity to services and the Internet. In a first operating mode, communications to and from a UE passes through access node 110. In a second operating mode, communications to and from a UE do not pass through access node 110, however, access node 110 typically allocates resources used by the UE to communicate when specific conditions are met. Communication between a UE pair in the second operating mode occurs over sidelinks 125, comprising uni-directional communication links. Communication between a UE and access node pair also occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

As discussed previously, edge computing (EC) services, as well as application services, use anycast or unicast Internet protocol (IP) addresses to represent service addresses. The availability of an application server (AS) is programmed into route controllers and advertised using a border gateway protocol (BGP) (or an interior gateway protocol (IGP)). This provides for a scalable and resilient way for users to access AS.

The IP packet to edge application servers (EASs) (at the mobile edge) connection spans from the UE to a user plane function (UPF), such as an uplink classifier (ULCL) UPF, that is capable of steering traffic to a local UPF packet data unit (PDU) session anchor (PSA) or forwarding the traffic to a central UPF PSA. However, because the routes corresponding to a service destination (e.g., the EAS) are advertised using BGP, IGP, etc., they are not known to the ULCL UPF, and therefore the ULCL UPF will be unable to steer packets to the EASs unless the ULCL UPF is aware of the routes corresponding to EAS located at the edge.

Figure 2:
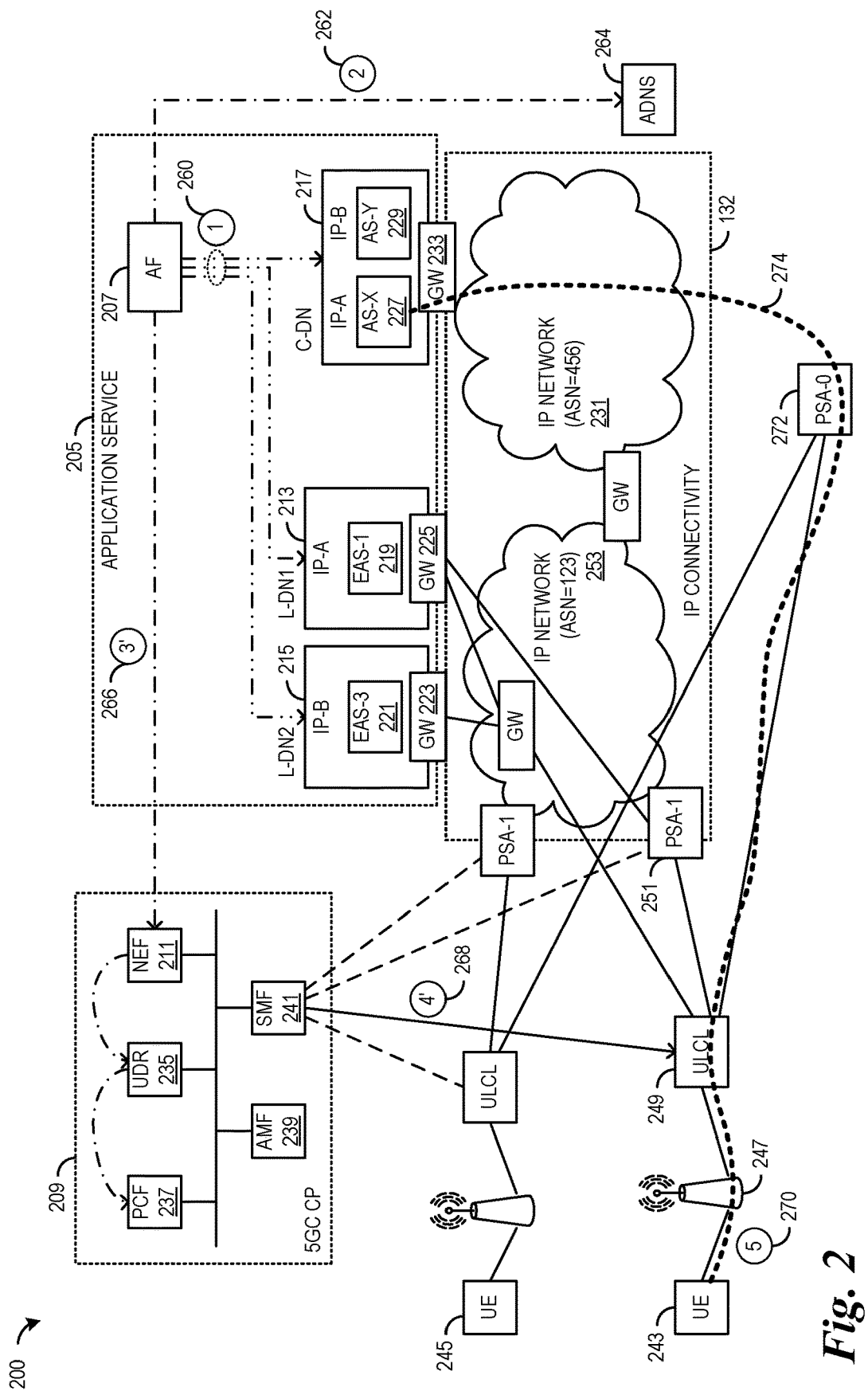
FIG. 2 illustrates a communication system supporting edge computing (EC) and edge application servers (EASs), communication system supporting the prior art technique of programming and advertising routes.

FIG. 2 illustrates a communication system 200 supporting EC and EASs, communication system 200 supporting the prior art technique of programming and advertising routes. Communication system 200 includes an application service 205. Application service 205 provides one or more servers for supporting an application or service, and includes an application function (AF) 207 that interacts with a 5G core (5GC) control plane (CP) 209, byway of a network exposure function (NEF) 211, for example, to access network capabilities. AF 207 also interacts with local data networks (L-DNs) or local data centers, such as L-DN1 213 and L-DN2 215, and centrally located data networks (C-DNs) or data centers, such as C-DN 217. L-DNs include EASs, such as EAS 219 and EAS 221, and are connected to IP networks byway of gateways (GWs), such as GW 223 and 225. C-DN 217 include a first autonomous system 227 associated with a first IP address and a second autonomous system 229 associated with a second IP address, although a C-DN may include any number of autonomous systems (e.g., one, two, three, four, and so on) associated with IP addresses. C-DN 217 is connected to IP network 231 by way of GW 233.

In addition to NEF 211, which provides an external interface to edge network services and capabilities, 5GC CP 209 also includes a unified data repository (UDR) 235 (which may be a database for 5G specific information), a policy control function (PCF) 237 (which is a control plane network function used to control user and network policy), an access and mobility management function (AMF) 239 (which processes requests related to connectivity and mobility management), and session management function (SMF) 241 (which processes requests related to session management).

Communication system 200 also includes UEs (such as UE 243 and 245). UEs are connected to an IP network through an access node and a UPF uplink classifier (ULCL)

that forwards traffic to a local UPF PDU session anchor (PSA). As an example, traffic from UE 243 travels through access node 247, ULCL 249, and PSA 251 to reach IP network 253.

A prior art technique involved in programming and advertising routes includes:

Application domain service configuration (event 260)—AF 207 provisions servers in L-DNs and C-DNs. Provisioning includes service addresses that are advertised in a set of networks identified by an autonomous system number (ASN).

Domain name server (DNS) provisioning (event 262)—AF 207 provisions an authoritative DNS (ADNS) 264 for the services. ADNS 264 replies to DNS resolvers with the service address of a service when queried with a service fully qualified domain name (FQDN).

Application domain influences traffic routing (event 266)—AF 207 installs traffic routing at NEF 211.

Mobile network installs routing rules (event 268)—Routing rules are advertised.

Steering application traffic (event 270)—Data packets are sent to PSA 272, where they are sent to closest EAS, AS 227. Because the data packets are sent to PSA 272, they are further sent to AS 227, which is the closest EAS to PSA 272, but may not be the desired result. The path taken by the data packets are shown as dotted line 274. Examples of desired results include lower latency, lower cost, load balancing, improved network utilization, etc.

Therefore, there is a need for methods and apparatus for session steering to application servers.

According to an example embodiment, methods and apparatus are provided for programming the presence of EASs into the ULCL so that the ULCL can make appropriate traffic steering decisions. The ULCL can be programmed with the presence of EASs so that the ULCL can make traffic steering decisions for different deployment scenarios (such as publicly routable applications, private applications with message based security, virtual private network (VPN) access, and so on). A new ULCL can be provisioned with traffic filters to steer traffic and support the mobility of the user (i.e., UEs).

In an embodiment, the application domain influences traffic routing in the mobile network. As an example, the service addresses and locations in the application domain are used to steer traffic. The service addresses and locations in the application domain are provided to the mobile network operator (MNO), e.g., 5GC CP 209, so that traffic of PDU sessions may be steered using the service addresses and locations, for example. An IP route control mechanism may be used to advertise the routes. In an embodiment, IP route control mechanisms are not possible for a ULCL, so an extension to AF traffic influence is provided. Details of example extensions to the AF traffic influence are provided below.

In an embodiment, service routes and traffic steering rules generated in accordance with the service addresses (server IP addresses) and locations in the application domain are provided to the user plane, e.g., the ULCL. The service routes and traffic steering rules may be provided when the UE establishes a PDU session, for example. Details of example service routes and traffic steering rules being provided during PDU session establishment are provided below. These examples may also be applicable in deployments with distributed PSAs and no ULCL.

In an embodiment, information related to service addresses and locations of mobile edge application domains are translated, stored, and provisioned in 5GC and user plane to steer data traffic to the closest EAS.

In an embodiment, data packets with destination addresses of the edge data network (e.g., L-DNs 213 and 215) with provisioned traffic steering rules are directed to local PSAs rather than a global PSA (such as PSA 272). From a local PSA, the data packets are routed to a closest EAS. The routing to the closest EAS may take place using standard IP anycast routing, for example.

In an embodiment, the AF in the application domain, orchestrates servers in data centers (local or cloud), generate a new request to the 5GC. The request provides the 5GC with the service address (e.g., an IP anycast address) and a data network access identifier (DNAI) where the servers are provisioned. The AF translates the DNAI using the ASN of the IP network, for example. Furthermore, when servers are removed or fail, the AF may use the interface to update and delete the servers.

In an embodiment, the NEF supports processing of the new request from the AF. Additional services at the NEF are not required. The NEF adds the network slice selection assistance information (NSSAI) or single NSSAI (S-NSSAI) and forwards it as usual.

In an embodiment, the UDR stores the new information as application data, AF transactions, or S-NSSAI and data network name (DNN). Additional fields in the data set include service address (IP anycast address), list of DNAI needed, and so on.

In an embodiment, the PCF follows existing procedures to subscribe to the AF traffic influence request. The PCF determines a set of DNAI that is close to each data network location (e.g., GW address). Determination of the proximity of the DNAI, GW address (e.g., data network location), involves the PCF obtaining a list of DNAI and GWs that are topologically or administratively close from the OAM. The information may be obtain as part of the configuration process, for example. The PCF organizes the received information into the list of service addresses (srv-IP-addr) for each DNAI.

In an embodiment, the SMF receives the data set per DNAI with a list of service addresses (e.g., IP or IP anycast addresses) for edge application routing. The SMF may select a local PSA that is close to the DNAI and construct forwarding action rules (FAR) to be inserted into the ULCL. All service IP addresses that apply to the DNAI where the PDU session terminates (i.e., a local PSA) are inserted as FARs in the ULCL.

Figure 3:
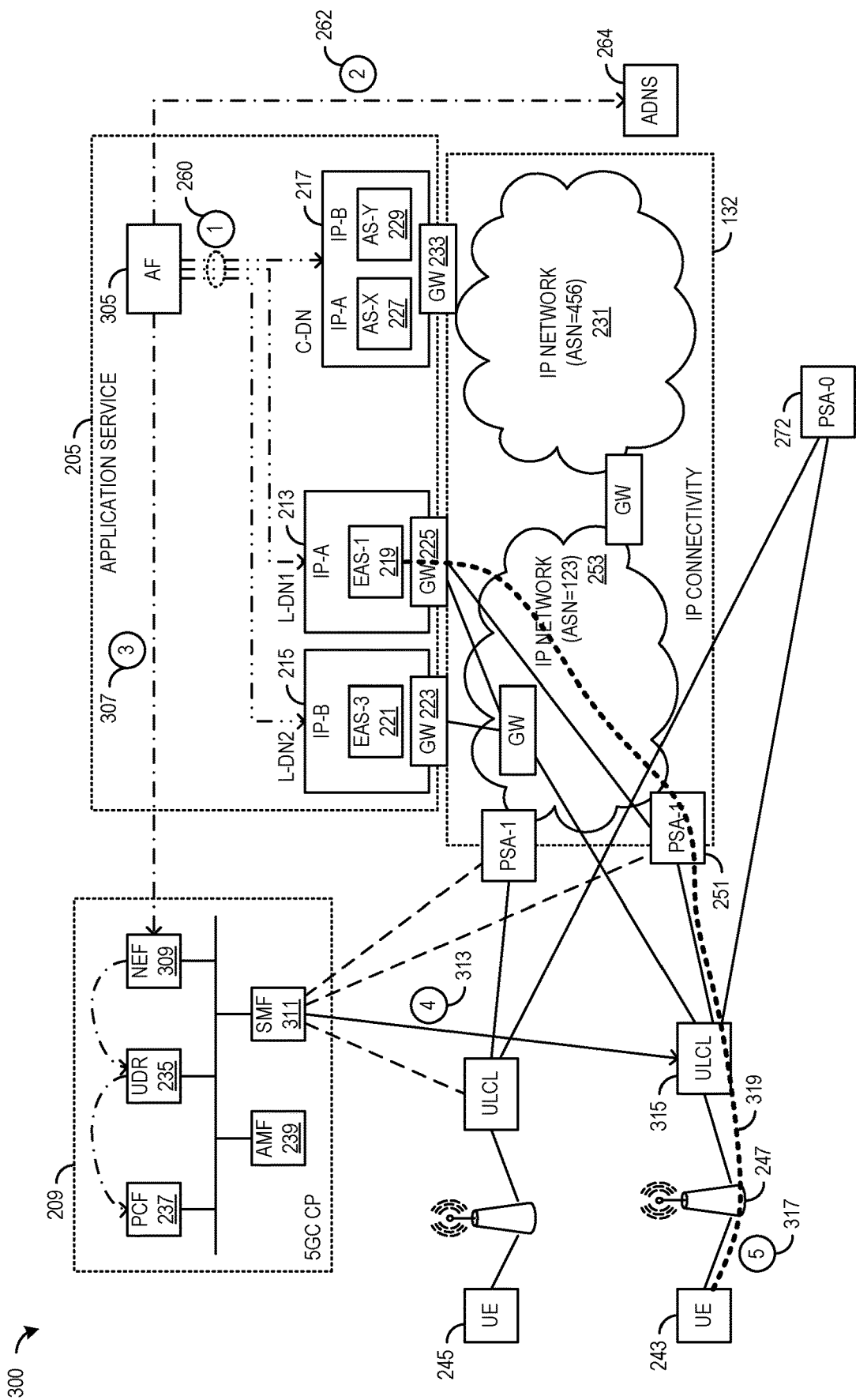
FIG. 3 illustrates a communication system supporting the programming the presence of EASs into uplink classifiers (ULCL) so that the ULCLs can make appropriate traffic steering decisions according to example embodiments presented herein.

FIG. 3 illustrates a communication system 300 supporting the programming the presence of EASs into ULCLs so that the ULCLs can make appropriate traffic steering decisions. Communication system 300 includes a variety of entities or functions, wherein entities or functions of communication system 300 that share reference numerals with entities or functions of communication system 200 behave similarly.

As shown in FIG. 3, AF 305 configures application domain services (event 260). AF 305 provisions servers in data centers (e.g., L-DNs and C-DNs). Provisioning includes specifying service addresses (e.g., an IP anycast address) that are advertised in the set of networks identified by the ASN.

AF 305 also provisions the DNS (event 262). As an example, ADNS 264 is the authoritative DNS for the service so that when queried with a FQDN for that particular service, ADNS 264 replies to the DNS resolver with the service address associated with the service. ADNS 264 may be hosted or managed in the application domain.

AF 305 conveys service addresses and locations in the application domain to the MNOs (event 307). The service addresses and locations in the application domain are conveyed to the MNOs to enable the steering of data traffic of PDU sessions. Typically, IP route control mechanisms are used to advertise the routes. But because ULCLs do not support IP route control mechanisms, extensions to the AF traffic influence are used.

The service addresses and locations in the application domain may be conveyed to NEF 309 of 5GC CP 209, for example. NEF 309 provides the service addresses and locations to UDR 235, PCF 237, and SMF 311. 5GC CP 209, byway of SMF 311, for example, provides the service addresses and locations to ULCLs, such as ULCL 315. As an example, traffic steering rules associated with the service addresses and locations are installed in the ULCLs. In an embodiment, SMF 311 provides the traffic steering rules associated with the service addresses and locations to all ULCLs of communication system 300. In another embodiment, SMF 311 provides the traffic steering rules associated with the service addresses and locations to only those ULCLs of communication system 300 that are handling data packets addressed to services associated with the service addresses and locations.

Data packets with destination addresses to the edge data network (e.g., L-DN 213) are steering in accordance with the traffic steering rules provided by SMF 311 to the ULCLs (event 317). As an example, data packets of UE 243 with the destination address of a service supported by a server in L-DN 213 with EAS-1 219 are traffic steered by ULCL 315 to PSA 251 instead of being routed to PSA 272. From PSA 251, the data packets are routed to EAS-1 219 through GW 225. The routing to EAS-1 219 may use standard IP routing, for example. The path of the data packets from UE 243 with the destination address of L-DN 213 is shown in FIG. 3 as dotted line 319.

In an embodiment, traffic steering rules (e.g., service routes) are configured by the application domain to influence traffic routing in the MNOs. Configuring the traffic steering rules in the application domain allows for the steering of data packets based on the destination addresses of the data packets.

Figure 4:
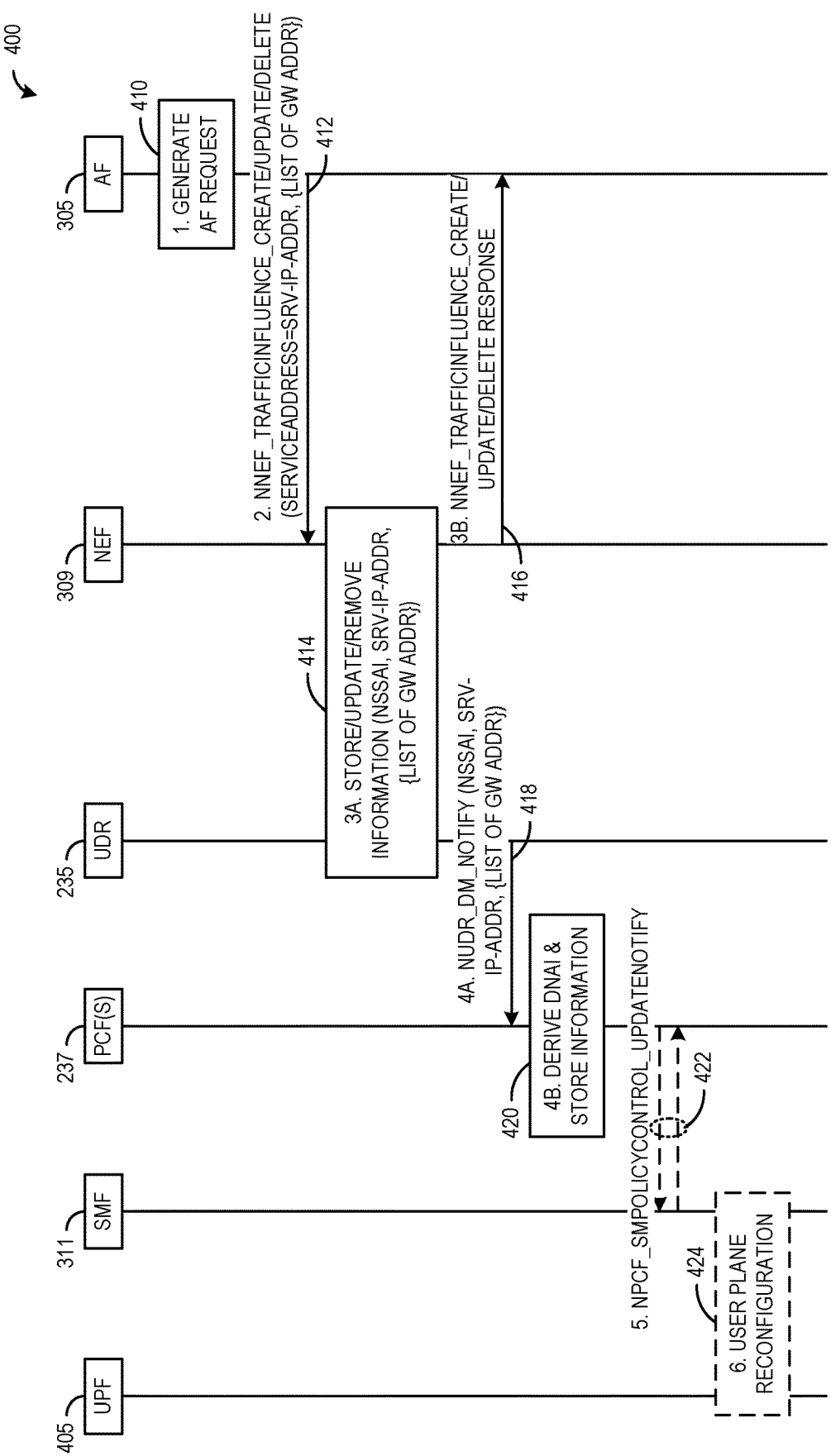
FIG. 4 illustrates a diagram of messages shared and processing performed by entities and functions of a communication system configuring the traffic steering rules according to example embodiments presented herein.

FIG. 4 illustrates a diagram 400 of messages shared and processing performed by entities and functions of a communication system configuring the traffic steering rules. The entities and functions involved in the configuring of the traffic steering rules includes a UPF 405 (of UE 243, for example), SMF 311, PCF(s) 237, UDR 235, NEF 309, and AF 305.

AF 305 orchestrates and configures the application in EASs and ASs at various data center locations by generating an AF request (block 410). The service may be exposed via DNS using an IP anycast service address (e.g., srv-IP-addr). AF 305 configures information at ADNS 264 with service or FQDN and address resolution to srv-IP-addr, for example.

AF 305 provides information related to the application to the MNO (event 412). As an example, AF 305 provides information related to the IP anycast service address associated with the application (e.g., srv-IP-addr). AF 305 also provides information about L-DN locations where the application is configured. The information about L-DN locations may comprise a list of the L-DN locations or GWs thereof. The information may be provided to the MNO (e.g., NEF 309) in an AF information request, e.g., a Nnef_TrafficInfluence_Create request message. Alternatively, Nnef_TrafficInfluence_Update or Nnef_TrafficInfluence_Delete request messages may be used. In a situation when there are multiple service addresses or redirect addresses for the EASs or ASs, AF 305 may provision all service addresses involved and provide information related to the service addresses to the MNO. Additionally, the FQDN may not be included in the information provided by AF 305 because the FQDN is not needed for AF influenced routing.

NEF 309 performs authorization controls and adds slice information to the information provided by AF 305 (block 414). The slice information includes NSSAI or S-NSSAI. NEF 309 also stores the information request from AF 305. The information request from AF 305 may be stored in UDR 235, for example. The information request stored at UDR 235 may include the data set, subset, or key. 3GPP TS 23.502, section 4.3.6, which is hereby incorporated herein by reference in its entirety, specifies the storing of the information request. NEF 309 also sends a response to the AF information request (event 416). The response to the AF information request may be in the form of a Nnef_TrafficInfluence_Create response message. Alternatively, Nnef_TrafficInfluence_Update or Nnef_TrafficInfluence_Delete response messages may be used.

PCF(s) 237 that have subscribed to modifications of the AF traffic influence dataset or subset are notified (event 418). PCF(s) 237 may be notified by UDR 235 using a Nudr_DM_Notify message. The Nudr_DM_Notify message includes the NSSAI, srv-IP-addr, and the information about L-DN locations. PCF(s) 237 determines a DNAI of a data network (block 420). PCF(s) 237 may determine a set of DNAIs of data networks that are close to each L-DN location (i.e., the GW addresses). PCF(s) 237 may obtain the list of DNAI and GWs that are topologically or administratively close from operations, administration, and maintenance (OAM) as part of a configuration processes. DNAIs of data networks and GWs are administratively close if they are managed by a single entity or multiple entities with an association with one another. PCF(s) 237 also stores a list of service addresses (e.g., srv-IP-addrs) and the DNAIs.

PCF(s) 237 determines PDU sessions impacted by the new AF traffic influence dataset (events 422). PCF(s) 237 identifies the PDU sessions impacted by the new AF traffic influence dataset by detecting the PDU sessions with destination address of the application, for example. PCF(s) 237 updates SMF 311 with a new policy and charging control (PCC) rule for each PDU session determined to be impacted by the new AF traffic influence dataset, for example.

SMF 311 reconfigures UPF 405 (block 424). SMF 311 reconfigures UPF 405 for each PCC rule received, for example. As related to PDU session modification where a central PSA has been established, SMF 311 combines the ULCL and a local PSA. As related to new PDU sessions, SMF 311 may establish a central PSA as well as the ULCL and the local PSA. In the situation where the PCC rule is updated due to a failure, SMF 311 may reselect a local PSA or ULCL.

The messages shared and processing performed by entities and functions presented above make use of basic AF influenced traffic routing for PDU sessions not identified by a UE address, as specified in 3GPP TS 23.502, section 4.3.6.2, which is hereby incorporated herein by reference in its entirety. Route information corresponding to the services configured at a data network with a particular DNAI in the application domain is provisioned as discussed.

The messages shared and processing performed by entities and functions presented above may be used for publicly accessible applications or private applications. As an example, private deployments with VPNs would expose VPN connectivity GWs only. For private deployments with zero trust and more granular access, each service with access may be separately exposed (e.g., DNS queries over HTTPS (DoH), application service(s), etc.).

In an embodiment, methods and apparatus for determining the proximity of data networks with particular DNAIs and L-DN locations are provided. In block 420 of FIG. 4, PCF(s) 237 determines DNAIs of data networks and GWs that are topologically or administratively close to each other. An example technique for determining proximity is provided below.

Figure 5:
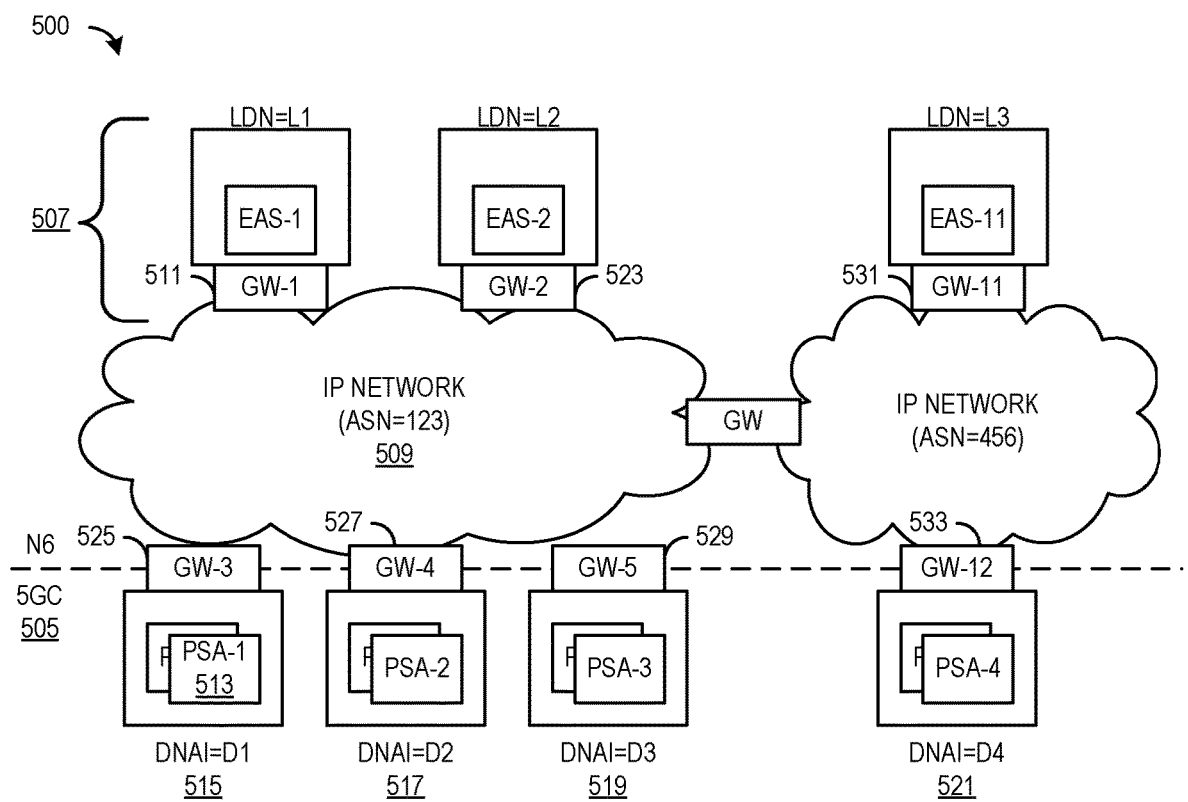
FIG. 5 illustrates communication system highlighting network segments and mapping proximate EASs to data networks with data network access identifiers (DNAI) according to example embodiments presented herein.

The EASs and UPF are in different network segments. However, they may still be close topologically or administratively. FIG. 5 illustrates communication system 500 highlighting network segments and mapping proximate EASs to data networks with DNAIs. Communication system 500 comprises a variety of network segments hosting 5GC network functions, UPF, etc. 505, as well as other network segments 507 hosting EASs with a local IP network 509 in between. Local IP network 509 has ASN=123.

An OAM (implemented in 5GC 505, for example) configures and manages the devices, and is aware of the administrative and topological distances between the GWs (e.g., GW 511) and between GWs and local PSAs (e.g., PSA 513) in a data network (e.g., data network 515) with a particular DNAI. The OAM uses distance information (related to the administrative and topological distances) to configure a PCF with all GWs that are proximate. As an example, OAM configures the PCF with the proximity information: data network 515 (with DNAI=D1)=(GW-1 511, GW-2 523, GW-3 525, GW-4 527, and GW-5 529), with the proximity information for data network 517 (with DNAI=D2) and data network 519 (with DNAI=D3) also being equivalent to the proximity information for data network 515 (with DNAI=D1). However, the proximity information for data network 521 (with DNAI=D4)=(GW-11 531, and GW-12 533), which is different from the proximity information of the other data networks shown in FIG. 5.

As shown in FIG. 5, GW-1 511 and GW-2 523 are connected to IP network 509, hence GW-1 511 and GW-2 523 are proximate. The data networks are configure in UPF 405 by the OAM, while PCF(s) 237 obtains lists of GWs attached to a network with a particular ASN, as well as a list of PSAs with or without closest GWs.

The proximity of a data network with a particular DNAI and GWs allows for the routing configuration in SMF 311 during the setup of a PDU session. Details are presented below.

In an embodiment, a PDU session that follows the split model (where a default path from the UE (e.g., UE 243) to a central PSA (e.g., PSA 272), and another path from the UE to a local PSA (e.g., PSA 251)) needs routing rules configured at the ULCL to support selective traffic steering to a local destination.

Figure 6:
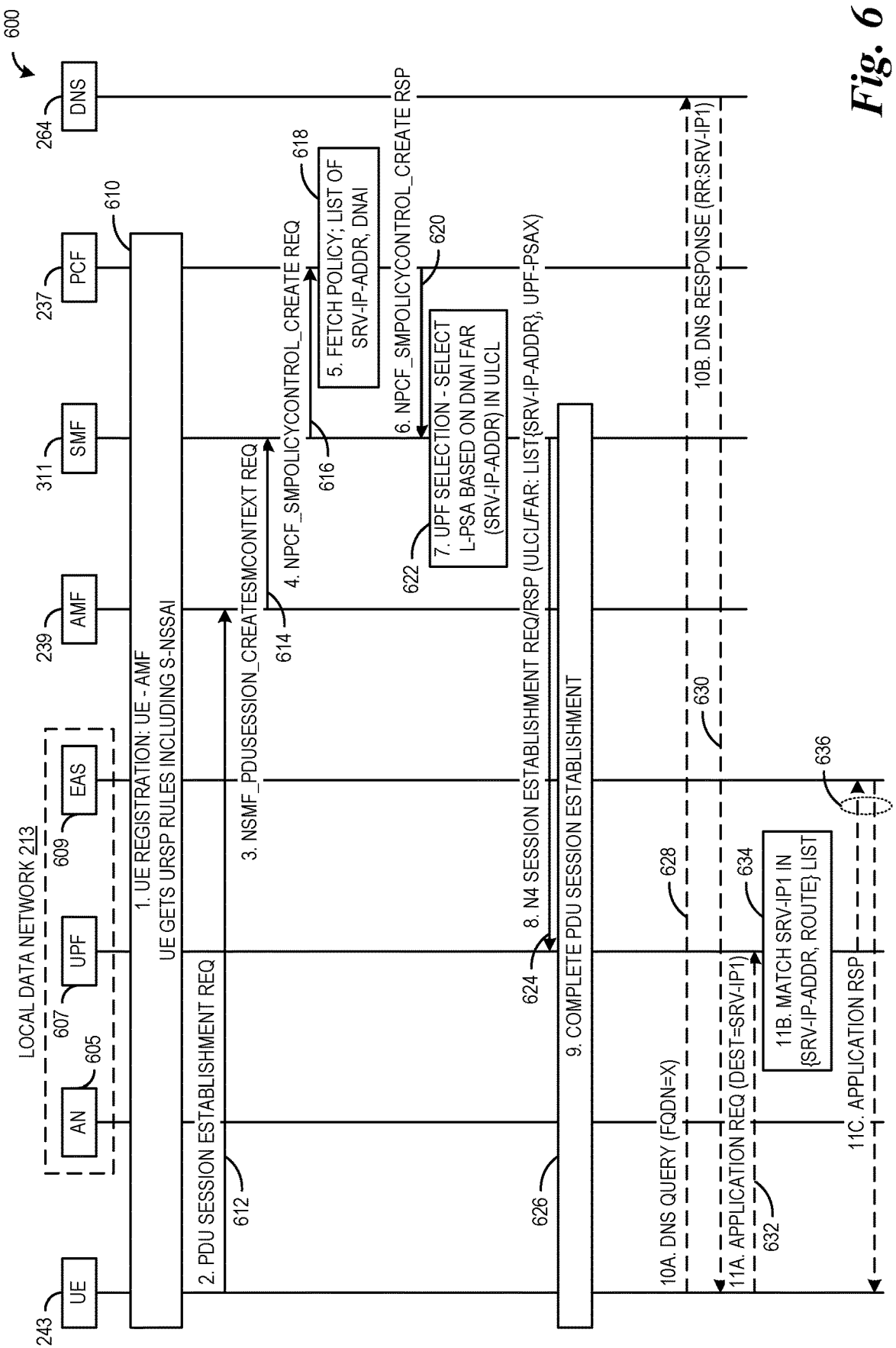
FIG. 6 illustrates a diagram of messages shared and processing performed by entities and functions of a communication system updating user equipment (UE) policies and setting up a split packet data unit (PDU) session according to example embodiments presented herein.

FIG. 6 illustrates a diagram 600 of messages shared and processing performed by entities and functions of a communication system updating UE policies and setting up a split PDU session. The entities and functions involved include a UE 243, an access node 605 of L-DN 213, a UPF 607 of L-DN 213, an EAS 609 of L-DN 213, AMF 239, SMF 311, PCF 237, and DNS 264.

UE 243 registers with AMF 239 (block 610). The registration of UE 243 with AMF 239 may utilize the procedures described in 3GPP TS 23.502, section 4.2, which are hereby incorporated herein by reference in its entirety, for example. In addition, UE 243 may either be configured or dynamically provided with UE route selection policy (URSP) rules that indicate the network slice (e.g., a network slice identified by a S-NSSAI) to use for edge applications or subsets of applications.

UE 243 sends a PDU session establishment request (event 612). The PDU session establishment request is sent to AMF 239. UE 243 may launch the application and select a S-NSSAI for the PDU session. The PDU session establishment request is sent with the network slice identified with S-NSSAI. AMF 239 selects a SMF (e.g., SMF 311) and sends a request message to SMF 311 (event 614). The request message is a Nsmf_PDUSession_CreateSMContext request, for example.

SMF 311 selects a PCF (e.g., PCF 237) and request policy for the PDU session (event 616). SMF 311 sends a Npcf_SMPolicy_Control request message to request the policy for the PDU session from PCF 237, for example. PDU session being associated with S-NSSAI. PCF 237 fetches policy (block 618). PCF 237 fetches policy for the PDU session. The policy fetched by PCF 237 includes a list of service IP addresses for the data network with DNAI. PCF 237 sends the policy to SMF 311 (event 620). PCF 237 sends a Npcf_SMPolicy_Control response message to send the policy to SMF 311, for example. The Npcf_SMPolicy_Control response message includes the policy for the PDU session.

SMF 311 selects a UPF (e.g., UPF 607) (block 622). SMF 311 selects UPF 607 in accordance with the technique described in 3GPP TS 23.502, section 4.3.2.2.1, which is hereby incorporated herein by reference in its entirety, for example. In addition to UPF selection, SMF 311 selects a local PSA, which may also be selected based on the DNAI FAR of the data network for srv-IP-addr in the ULCL.

SMF 311 programs UPF 607 (event 624). The programming of UPF 607 may take place over the N4 interface. SMF 311 provisions both local and central PSAs as specified in 3GPP TS 23.502, which is hereby incorporated herein by reference in its entirety. Furthermore, the ULCL is provisioned with the DNAI FAR traffic filters for the destination addresses corresponding to the list of service IP addresses. This particular action is forwarded to the local PSA.

The PDU session establishment procedure is completed (block 626).

UE 243 sends a DNS query over the established PDU session (event 628). The DNS query may be sent as an application message by UE 243. If there are no routing rules corresponding to the DNS destination address, the application message (with the DNS query) is forwarded to the central PSA (e.g., PSA 272). However, if there is a routing rule corresponding to the DNS destination address (e.g., DoH in a private network), the ULCL (e.g., ULCL 315) forwards the application message to the local PSA (e.g., PSA 251). In the situation where VPNs are used, all application messages will be forwarded to the matched destination address. Because no inspection of the DNS message (e.g., DNS query or DNS response) is necessary, support for Do53, DNS over Transport Layer Security (DoT), and DoH are provided. UE 243 receives a DNS response (event 630). The DNS response includes authentication (A) or authentication/authorization/accounting (AAA) record srv-IP1, for example.

UE 243 sends an application request with destination address of srv-IP1 (event 632). The application request is sent to UPF 607, for example. UPF 607 checks rules for a match with srv-IP1 (block 634). If there is a successful rule match UPF 607 forwards the application request to local PSA, which forwards the application request to EAS 609 (events 636). A response to the application request is provided to UE 243.

In an embodiment, servers are relocatable as needed. The application domain determines that a server should be relocated to support local networks with split PDU sessions.

Figure 7:
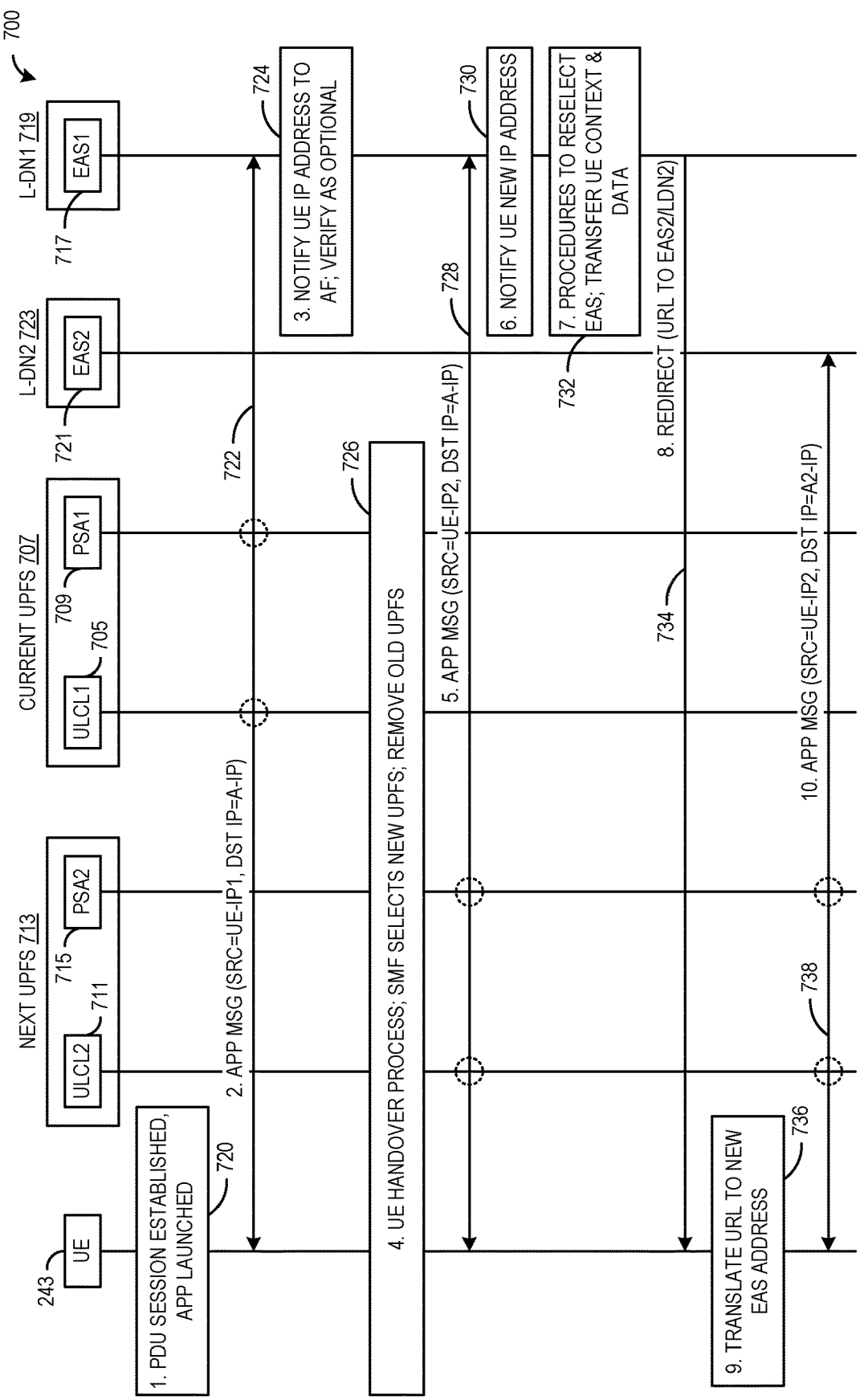
FIG. 7 illustrates a diagram of messages shared and processing performed by entities and functions of a communication system involved in relocating a server according to example embodiments presented herein.

FIG. 7 illustrates a diagram 700 of messages shared and processing performed by entities and functions of a communication system involved in relocating a server. The entities and functions involved in relocating the server include UE 243, a first ULCL 705 of a current UPF 707, a first PSA 709 of current UPF 707, a second ULCL 711 of a next UPF 713, a second PSA 715 of next UPF 713, a first EAS 717 of a first L-DN 719, and a second EAS 721 of a second L-DN 723.

UE 243 establishes a PDU session (block 720). UE 243 attaches and establishes the PDU session to first PSA 709 of UPF 707 with address UE-IP1. UE 243 also launches an application. The application has a DNS translation with an anycast address. First EAS 717 may provide a redirect address so that the server (first EAS 717) remains sticky even after UE mobility. The server remaining sticky means that the server is not relocated after UE mobility.

UE 243 sends an application message with anycast destination address A-IP (event 722). The application message with the anycast destination address A-IP matches a filter rule at first ULCL 705, and first ULCL 705 forwards the application message to first PSA 709. Routers in first L-DN 719 forward the application message to first EAS 717 using anycast routing.

First EAS 717 notifies the AF (e.g., AF 305) of the IP address of UE 243 (block 724). The notification of the AF may occur in the application domain using application domain signaling. If the AF evaluates that there is a better EAS (e.g., second EAS 721) than first EAS 717, the AF may initiate server relocation procedures.

For discussion purposes, consider the case where the AF initiates server relation procedures. UE 243 participates in a handover to a new access network or RAN (block 726). Additionally, second PSA 715 is selected. As a result of the handover, UE 243 has a new IP address UE-IP2. The handover may be as specified in 3GPP TS 23.502. The SMF may remove old UPFs (such as first UPF 707) after a time delay. Removal of the old UPFs may occur as detailed below. Delaying the removal of old UPFs may help to minimize the loss of in-flight data packets.

UE 243 continues to send application messages (event 728). The new application messages are sent with the new IP address UE-IP2. The new application messages include the anycast destination address of first EAS 717, A-IP. In a typical request-response sequence, first EAS 717 is immediately aware of the new IP address UE-IP2 because it is the source address in the request message. However, if the application pattern is downstream biased (e.g., multicast video delivery) or notifications, UE 243 may send a new request (e.g., a subscribe, multicast status report change, etc.) to initiate redirection to the new UE location or new PSA (post handover). The action of UE 243 informs first EAS 717 of the new IP address of UE 243.

First EAS 717 notifies the AF of the new IP address of UE 243 (block 730). Application domain signaling may be used to notify the AF of the new IP address of UE 243. The AF re-evaluates first EAS 717 or first L-DN 719. For discussion purposes, the case where the AF determines that relocation to second EAS 721 is warranted.

A procedure to reselect the EAS is performed (block 732). Reselection of the EAS involves the AF, first EAS 717 (the current EAS), and second EAS 721 (the target EAS). Mechanisms to transfer the context and related data of UE 243 are initiated.

Once second EAS 721 replicates the application state, first EAS 717 sends an application layer redirect message (event 734). The application layer redirect message is sent to UE 243, and may include a URL of second L-DN 723 or second EAS 721. UE 243 requests a DNS translation of the URL (block 736). UE 243 may transmit a DNS request, for example, and receives a DNS response with the anycast address of second L-DN 723.

UE 243 sends application messages (event 738). The application messages include the source IP address of UE 243 (UE-IP2) and the destination address of second L-DN 723. The destination address of second L-DN 723 may be programmed in N6 to route to second EAS 721 unless there is a failure of some sort. Hence, N6 routers forward packets to second EAS 721.

Access may be in the form of local access or proximate access. In local access, there is a one-to-one association between the 5GC and edge application resources. However, in proximate access, there is a N-to-M association between the 5GC and edge application resources. The local access model implies that there is no separation between the 5GC and edge application domains. This leads to security implications because there is a lack of separate policy domains. Each DNAI may be required to have edge application resources. The proximate access model has separation of multiple separate policy domains (e.g., ASNs) with an interconnection methodology.

Mobility in a communication system supporting local access results in also moving EASs, which requires synchronization and complicated signaling. Mobility in a communication system that supports proximate access is independent of EAS relocation, thereby eliminating complicated signaling. Hence, in the local access model, edge server relocation is complex because the relocation of the EAS is coupled to the relocation of the local PSA. This implies that when the PDU session is changed due to UE mobility, the EAS has to be relocated. This may result in more jitter than just moving one end. However, in the proximate access model, there is clear separation of the two domains and an optimal method of routing between the two domains exist. Thus UE mobility and server relocation in each domain can proceed independently. There is no need to synchronize mobility between the two domains and the result is lower transport jitter during mobility because only one end is moved.

When a failure of an edge computing component in a communication system utilizing local access occurs, coordination with the 5GC may be needed to remedy the failed component. However, in a communication system utilizing proximate access, component relocation on failure of an edge computing component is independent of the 5GC. The provisioning of resources in a communication system with local access involves controllers (i.e., 5GC and AF or edge controller) synchronizing resources in different domains. In a communication system supporting proximate access, the provisioning of resources involves the 5GC and AF or edge controller only coordinating to change routes. This is referred to as loose coordination. In the local access model, failure of an application domain resource can result in the relocation of the PDU session or DNAI. This may lead to a cascade of issues because there are two controllers of different resource domains (i.e., 5GC and edge application) attempting to coordinate recovery. In the proximate access model, the AF may redirect to the next best (or automatically via anycast) server and does not require the PDU session to be modified. The resource domains independently control their resources.

Figure 8A:
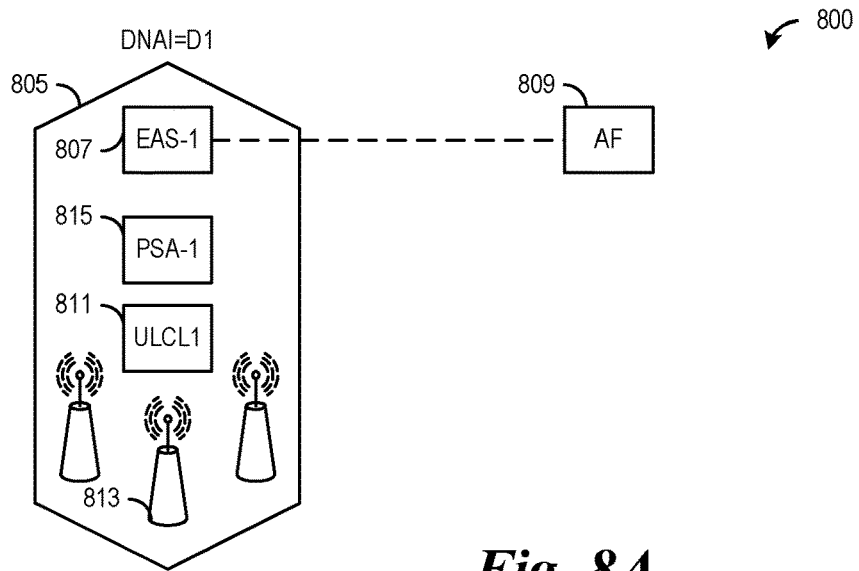
FIG. 8A illustrates a first communication system highlighting local access.

FIG. 8A illustrates a first communication system 800 highlighting local access. In communication system 800, a data network 805 has a DNAI=D1. In data network 805, EAS 807 is connected to AF 809. The presence of EAS 807 is known by ULCL 811, which routes traffic from access nodes, such as access node 813, to EAS 807 through PSA 815.

Figure 8B:
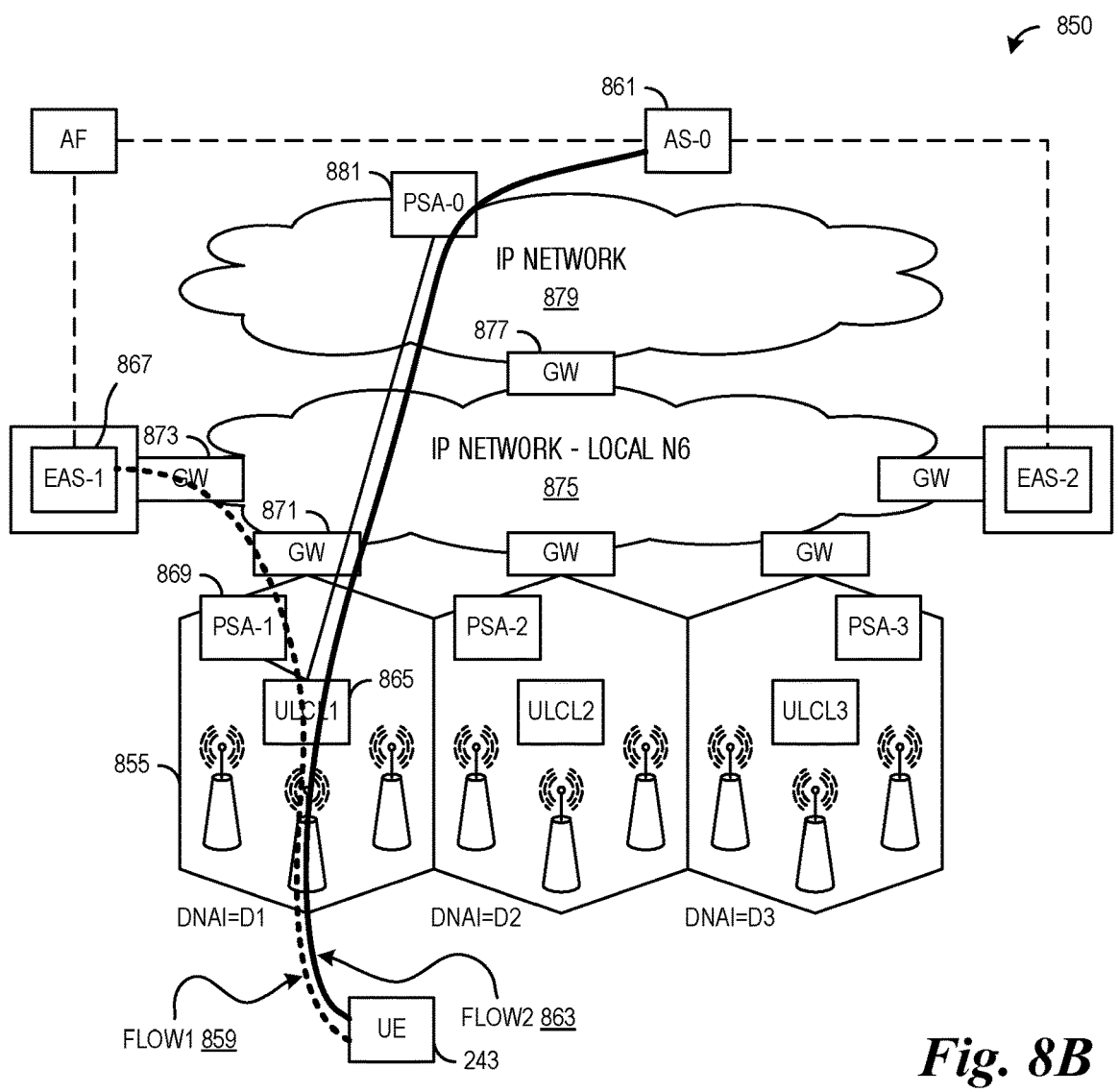
FIG. 8B illustrates a first communication system highlighting proximate access. In communication system, UE connected to data network and obtains service from EAS through flow according to example embodiments presented herein.

FIG. 8B illustrates a first communication system 850 highlighting proximate access. In communication system 800, UE 243 connected to data network 855 and obtains service from EAS 857 through flow 859. UE 243 also obtains service from AS 861 through flow 863. Traffic over flow 859 is steered by ULCL 865 to EAS 867 over PSA 869, GW 871, and GW 873. Traffic over flow 863 is steered by ULCL 865 to AS 861 over GW 871, network 875, GW 877, network 879, and PSA 881.

Figure 9A:
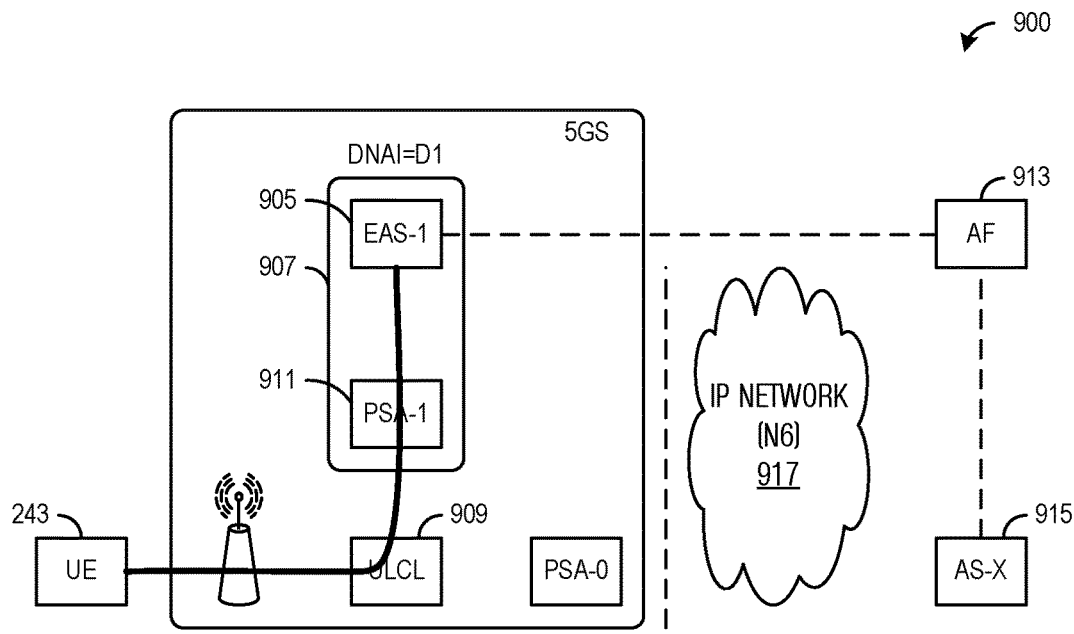
FIG. 9A illustrates a second communication system highlighting local access to a data network.

FIG. 9A illustrates a second communication system 900 highlighting local access to a data network. Communication system 900 includes UE 243 connected to EAS 905 of data network 907. Packets from UE 243 are steered by ULCL 909 to EAS 905 through PSA 911. EAS 905 is connected to AF 913 and AS 915 through network 917.

PSA 911 is in the same network segment as EAS 905, so there may be a security issue for both parties. Furthermore, AF 913 needs access to EAS 905 for orchestration. The access is not via a PDU session because orchestration uses a network-network interface (NNI) and not a user-network interface (UNI).

Figure 9B:
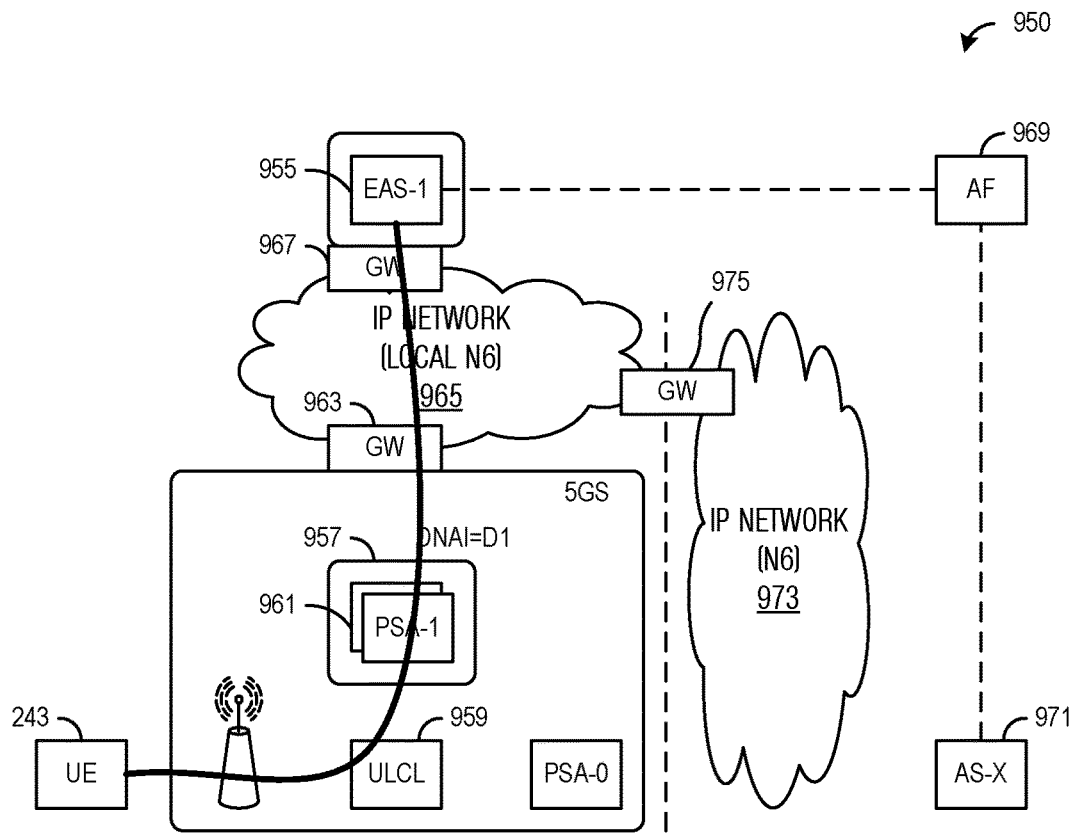
FIG. 9B illustrates a second communication system highlighting proximate access to a data network according to example embodiments presented herein.

FIG. 9B illustrates a second communication system 950 highlighting proximate access to a data network. Communication system 950 includes UE 243 connected to EAS 955 that is proximate to data network 957. ULCL 959 steers traffic from UE 243 to EAS 955 over PSA 961, network 965, and GW 967. EAS 905 is connected to AF 969 and AS 971 through network 973.

Because PSA 961 and EAS 955 are in different network segments, different routing and security policies may be implemented in the different network segments. PSA 961, network 965, and EAS 955 may be implemented as part of a single data center, implemented as different ASNs, and thus supporting different policies. Orchestration is managed by the same GW (e.g., GW 975) that grants access to remote resources.

Another problem addressed herein is how to route to the nearest EAS when a split PDU session (with a ULCL) needs rules to selectively steer the traffic. Some existing techniques use a DNS agent (e.g., proxy, inspector, relay, and so on) that is located at or near the ULCL to inspect the request and determine the intended destination of the DNS service request. The example embodiments presented herein manages and scales the DNS independently while supporting Do53, DoT, and DoH.

Drawbacks of the DNS methods include:
Because the DNS agents inspect each request (even the ones that have no edge deployment), potentially resulting in higher DNS resolution latency.
Reconfiguring the access (PDU session) during the DNS resolution process result in the DNS resolution taking additional time (not just for the translation).
Access may be redirected and reconfigured based on the inspected DNS requests, which may lead to additional delay.
Disruption during a handover may occur because DNS processing is required to handle selection.
Privacy may not be supported, e.g., when DoH is used, the resolver may be in a third party network. Alternatively, if VPNs are used, no DNS requests are visible.

The example embodiments presented herein feature:
Routes in the ULCL are provisioned during PDU session handling. Hence, there is no delay in handling DNS requests because only DNS translation needs to be performed.
Reconfiguring of access during the DNS resolution process is not needed.
The DNS resolvers may be deployed independently to increase scalability and resilience, with no need to place inspectors near each access or UPF.
Handovers occur without disruption because the DNS translations (IP addresses) are valid even after mobility.
Because there is no inspection of DNS requests, DoH, DoT, or DNS within a VPN may work with no additional changes.

Figure 10:
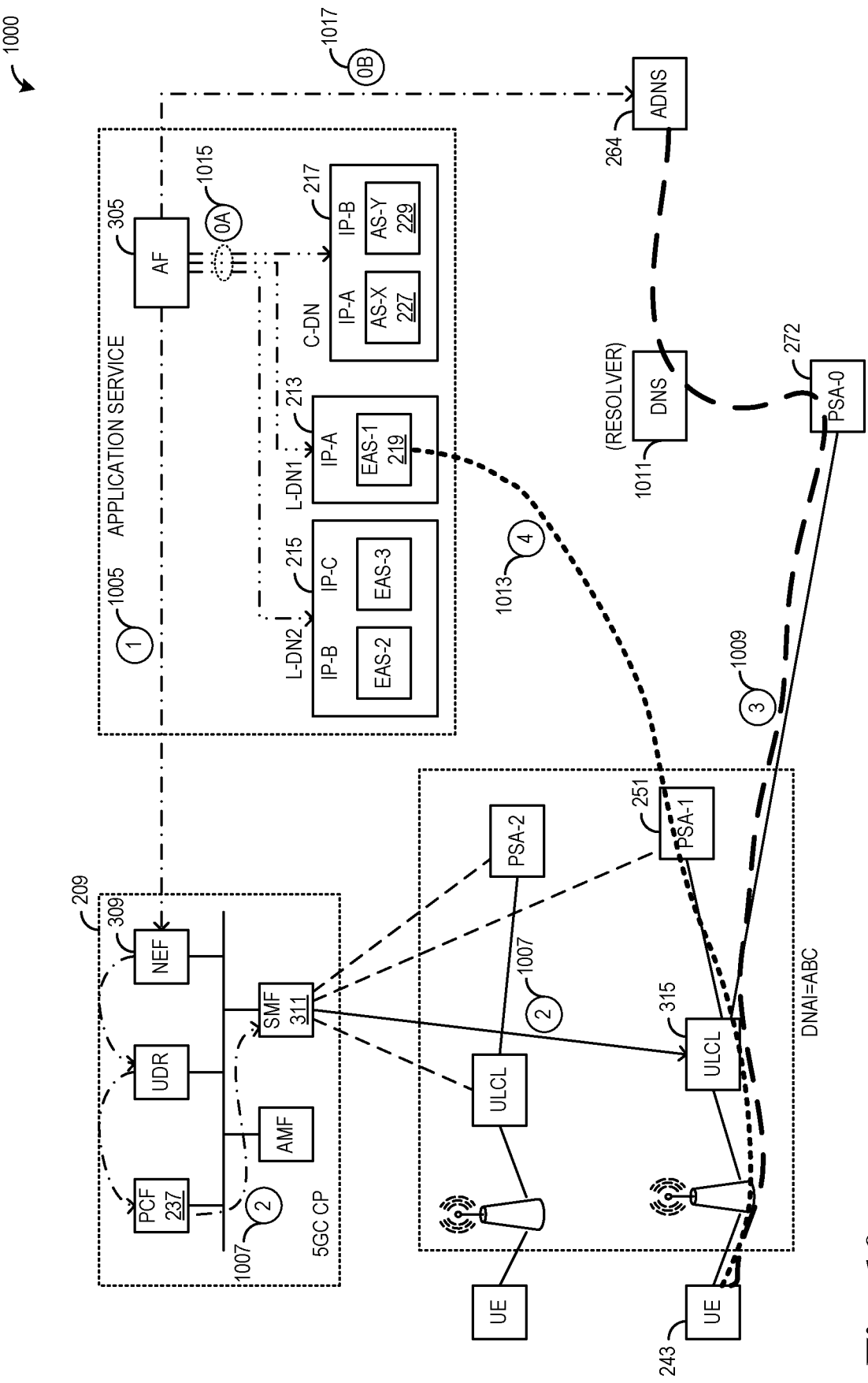
FIG. 10 illustrates a communication system highlighting an example configuration, along with PDU session and application flow according to example embodiments presented herein.

FIG. 10 illustrates a communication system 1000 highlighting an example configuration, along with PDU session and application flow. In events 1005, AF 305 to 5GC 209 interaction includes traffic influenced routing with service IP address and data network locations. In this situation, the data set includes (IP-a, {data network 213, data network 217}), (IP-b, {data network 215, data network 217}), and (IP-c, {data network 215}). AF 305 does not send a FQDN; the contract is only for routing and thus there is a minimal exchange of information. NEF 309, PCF 237, etc., add DNN and S-NSSAI, and organize the information based on DNAI.

In events 1007, UE 243 requests a PDU session setup (not shown in FIG. 10) and SMF 311 fetches policy including traffic influence routing rules. SMF 311 selects UPFs (of PSAs 251 and 272, and ULCL 315) based on the DNAI, etc. N4 match action filters for ULCL 315: {IP-a, PSA 251}, {IP-b, PSA 251}, and {IP-c, PSA 251}.

In events 1009, UE 243 requests DNS 1011 for resolution of a FQDN. DNS 1011 forwards the FQDN to ADNS 264, which responds with IP-a. ULCL 315 has no filter rule, thus the DNS request is not steered in this situation. For private networks, VPNs, etc., the DNS request may also be steered based on AF traffic influenced routing.

In events 1013, UE 243 sends an application request with destination address IP-a. ULCL 315 filters based on {IP-a, PSA 251} and steers to PSA 251. A local N6 network advertisement for anycast IP address IP-a (BGP, SDN) forwards to EAS 219.

In FIG. 10, it is accepted that AF 305 has configured services in the data networks (events 1015 and 1017). In events 1015 two services are configured, with one service having anycast IP address IP-a and the other having anycast IP address IP-b. ADNS 264 is configured with the corresponding FQDNs and resolution to IP-a and IP-b in event 1017.

Figures 11, 12:
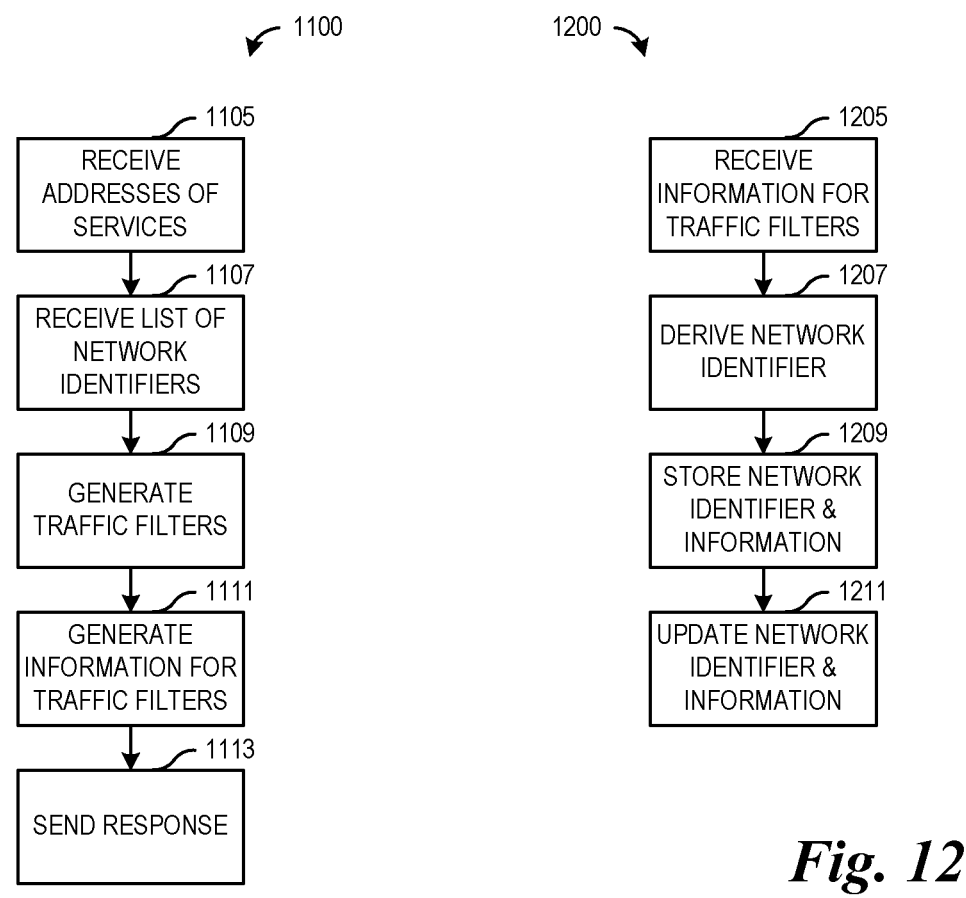
FIG. 11 illustrates a flow diagram of example operation occurring in a network exposure function (NEF) according to example embodiments presented herein.
FIG. 12 illustrates a flow diagram of example operations occurring in a policy control function (PCF) according to example embodiments presented herein.

FIG. 11 illustrates a flow diagram of example operation 1100 occurring in a NEF. Operations 1100 may be indicative of operations occurring in a NEF, such as NEF 309, as the NEF supports the configuration of assistance information to facilitate packet steering.

Operations 1100 begin with the NEF receiving addresses of services (block 1105). The addresses of services may be received from an AF, for example. The addresses of services may represent destination addresses of routes to application servers, for example. The address of services may be received in a service operation message, such as a Nnef_TrafficInfluence_Create, Nnef_TrafficInfluence_Update, or Nnef_TrafficInfluence_Delete message. The address of a service is in the form of an IP anycast address, and an example address of a service is srv-IP-addr. The NEF also receives a list of network identifiers (block 1107). The list of network identifiers may be received from the AF, for example. The list of network identifiers identifies local data network locations at which the addresses of services are configured. The list of network identifiers may be a list of gateways of the local data network locations, for example. The addresses of services and the list of network identifiers may be received in a single message or in separate messages. The NEF stores the addresses of services at the PCF.

The NEF generates traffic filters (block 1109). The NEF may generate the traffic filters, e.g., authorization controls, in accordance with the addresses of services and the list of network identifiers. The NEF generates information for the traffic filters (block 1111). The information for the traffic filters may comprise S-NSSAI. The traffic filters and the information for the traffic filters may be stored in a UDR. The NEF sends a response (block 1113). The response may be sent to the AF, for example. The response may be a service operation message, such as a Nnef_TrafficInfluence_Create, Nnef_TrafficInfluence_Update, or Nnef_TrafficInfluence_Delete response message.

FIG. 12 illustrates a flow diagram of example operations 1200 occurring in a PCF. Operations 1200 may be indicative of operations occurring in a PCF, such as PCF 237, as the PCF supports the configuration of assistance information to facilitate packet steering.

Operations 1200 begin with the PCF receiving information for the traffic filters (block 1205). The information for the traffic filters may be received from the UDR, for example. The information for the traffic filters may be received in a Nudr_DM_Nofity message, and may include the S-NSSAI, the addresses of the services, and the list of network identifiers. The PCF derives a network identifier (block 1207). The network identifier may be a set of DNAI that are close to each local data network location (e.g., gateway addresses). The DNAIs and gateways are topologically or administratively close to each other. The network identifier and the information for the traffic filters are referred to as AF traffic influence data set.

The PCF stores the network identifier and the information for the traffic filters (block 1209). The network identifier and the information for the traffic filters (such as the addresses of services) may be stored in a local memory. The PCF updates the network identifier and the information for the traffic filters (block 1211). As an example, the network identifier and the information for the traffic filters of PDU sessions that are affected by the AF traffic influence data set. If there are multiple PDU sessions affected by the AF traffic influence data set, the multiple PDU sessions are updated. Different PDU sessions may be updated with different information.

Figures 13, 14:
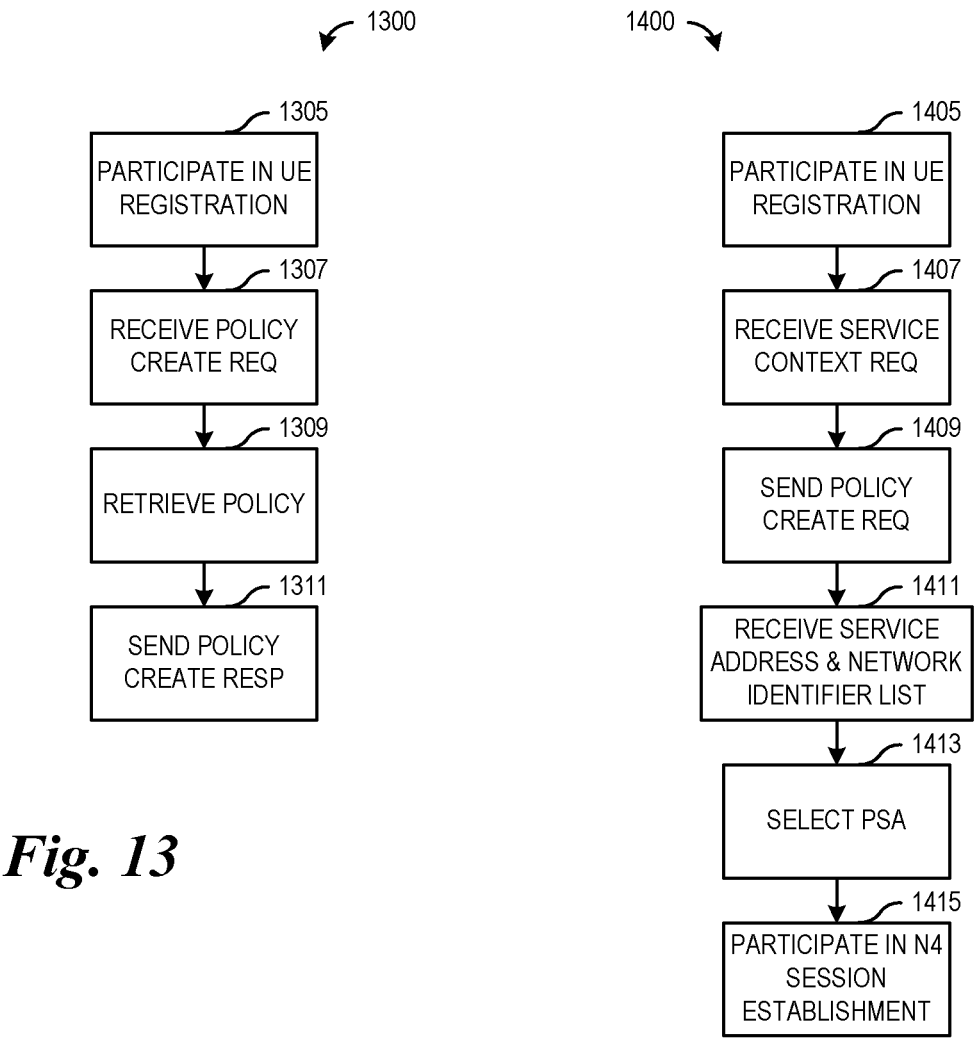
FIG. 13 illustrates a flow diagram of example operations occurring in a PCF participating in split model PDU session establishment and traffic steering according to example embodiments presented herein.
FIG. 14 illustrates a flow diagram of example operations occurring in a session management function (SMF) participating in split model PDU session establishment and traffic steering according to example embodiments presented herein.

FIG. 13 illustrates a flow diagram of example operations 1300 occurring in a PCF participating in split model PDU session establishment and traffic steering. Operations 1300 may be indicative of operations occurring in a PCF, such as PCF 237, as the PCF participates in split model PDU session establishment and traffic steering.

Operations 1300 begin with the PCF participating in UE registration (block 1305). The UE registers through the AMF. In addition to registration, the UE is either configured or dynamically provided with URSP rules indicating the network slice (identified by the S-NSSAI, for example) used for edge applications or subsets of applications. The PCF receives a policy create request (block 1307). The policy create request may be received from the SMF selected to manage the PDU session. The policy create request may be received as a Npcf_SMPolicy_Control message, e.g., a Npcf_SMPolicy_Control_Create request message. The policy create request includes the S-NSSAI, for example.

The PCF retrieves the policy (block 1309). The PCF retrieves the policy for the PDU session. The policy may include a list of service addresses for the DNAI, as well as the DNAI. The PCF sends a policy create response (block 1311). The policy create response may be sent to the SMF and includes the policy retrieved by the PCF. The policy create response may be sent as a Npcf_SMPolicy_Control message, e.g., a Npcf_SMPolicy_Control_Create response message.

FIG. 14 illustrates a flow diagram of example operations 1400 occurring in a SMF participating in split model PDU session establishment and traffic steering. Operations 1400 may be indicative of operations occurring in a SMF, such as SMF 311, as the SMF participates in split model PDU session establishment and traffic steering.

Operations 1400 being with the SMF participating in UE registration (block 1405). The UE registers through the AMF. In addition to registration, the UE is either configured or dynamically provided with URSP rules indicating the network slice (identified by the S-NSSAI, for example) used for edge applications or subsets of applications. The SMF receives a service context request (block 1407). The service context request may be received from the AMF. The service context request may be received in a Nsmf_PDUSession_CreateSMContext request message. The service context request includes the S-NSSAI used for edge applications or subsets of applications.

The SMF sends a policy create request (block 1409). The policy create request may be sent to the PCF selected to manage the PDU session. The policy create request may be sent as a Npcf_SMPolicy_Control message, e.g., a Npcf_SMPolicy_Control_Create request message. The policy create request includes the S-NSSAI, for example. The SMF receives a policy create response (block 1411). The policy create response may be received from the PCF and includes the policy (i.e., a list of service addresses for the DNAI, as well as the DNAI) retrieved by the PCF. The policy create response may be sent as a Npcf_SMPolicy_Control message, e.g., a Npcf_SMPolicy_Control_Create response message.

The SMF selects a local PSA (block 1413). The local PSA may be selected in accordance with the DNAI FAR and the service address by the ULCL. The SMF participates in an N4 session establishment (block 1415). The N4 session establishment includes the SMF programming UPF(s) over the N4 interface, where the UPF(s) are programmed with the DNAI FAR and the list of service addresses. The SMF also provisions the PSAs (local and central), and provisions the ULCL with the FAR traffic filters for destination addresses corresponding to the list of service addresses.

Figure 15:
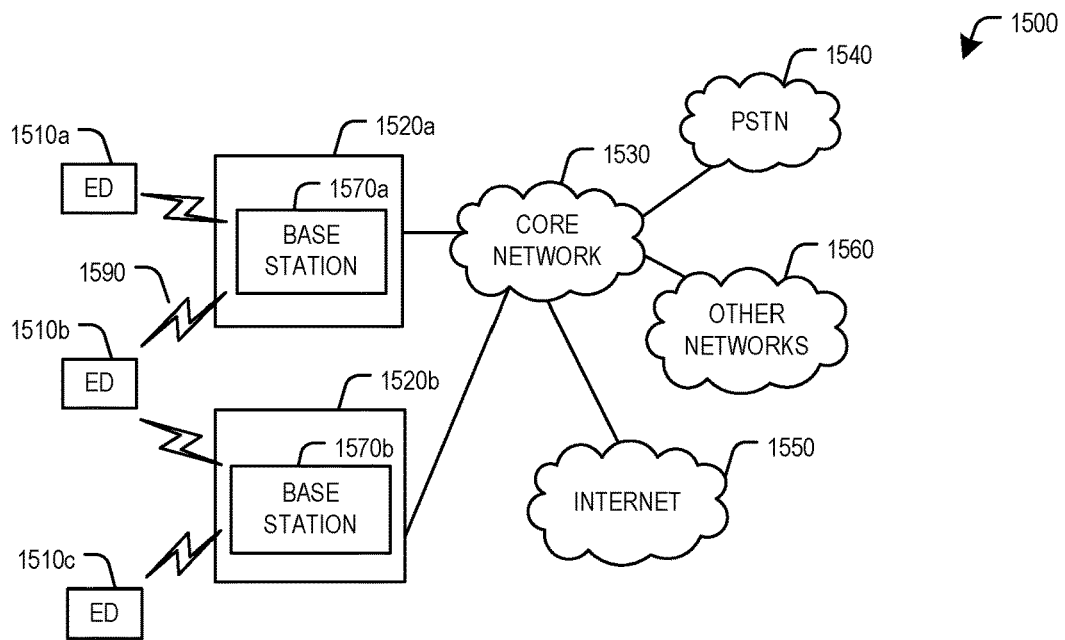
FIG. 15 illustrates an example communication system according to example embodiments presented herein.

FIG. 15 illustrates an example communication system 1500. In general, the system 1500 enables multiple wireless or wired users to transmit and receive data and other content. The system 1500 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1500 includes electronic devices (ED) 1510*a*-1510*c*, radio access networks (RANs) 1520*a*-1520*b*, a core network 1530, a public switched telephone network (PSTN) 1540, the Internet 1550, and other networks 1560. While certain numbers of these components or elements are shown in FIG. 15, any number of these components or elements may be included in the system 1500.

The EDs 1510a-1510c are configured to operate or communicate in the system 1500. For example, the EDs 1510a-1510c are configured to transmit or receive via wireless or wired communication channels. Each ED 1510a-1510c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1520a-1520b here include base stations 1570a-1570b, respectively. Each base station 1570a-1570b is configured to wirelessly interface with one or more of the EDs 1510a-1510c to enable access to the core network 1530, the PSTN 1540, the Internet 1550, or the other networks 1560. For example, the base stations 1570a-1570b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1510a-1510c are configured to interface and communicate with the Internet 1550 and may access the core network 1530, the PSTN 1540, or the other networks 1560.

In the embodiment shown in FIG. 15, the base station 1570a forms part of the RAN 1520a, which may include other base stations, elements, or devices. Also, the base station 1570b forms part of the RAN 1520b, which may include other base stations, elements, or devices. Each base station 1570a-1570b operates to transmit or receive wireless signals within a particular geographic region or area, sometimes referred to as a "cell." In some embodiments, multiple-input multiple-output (MIMO) technology may be employed having multiple transceivers for each cell.

The base stations 1570a-1570b communicate with one or more of the EDs 1510a-1510c over one or more air interfaces 1590 using wireless communication links. The air interfaces 1590 may utilize any suitable radio access technology.

It is contemplated that the system 1500 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1520a-1520b are in communication with the core network 1530 to provide the EDs 1510a-1510c with voice, data, application, Voice over Internet Protocol (VoIP), or other services. Understandably, the RANs 1520a-1520b or the core network 1530 may be in direct or indirect communication with one or more other RANs (not shown). The core network 1530 may also serve as a gateway access for other networks (such as the PSTN 1540, the Internet 1550, and the other networks 1560). In addition, some or all of the EDs 1510a-1510c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1550.

Although FIG. 15 illustrates one example of a communication system, various changes may be made to FIG. 15. For example, the communication system 1500 could include any number of EDs, base stations, networks, or other components in any suitable configuration.

Figure 16A:
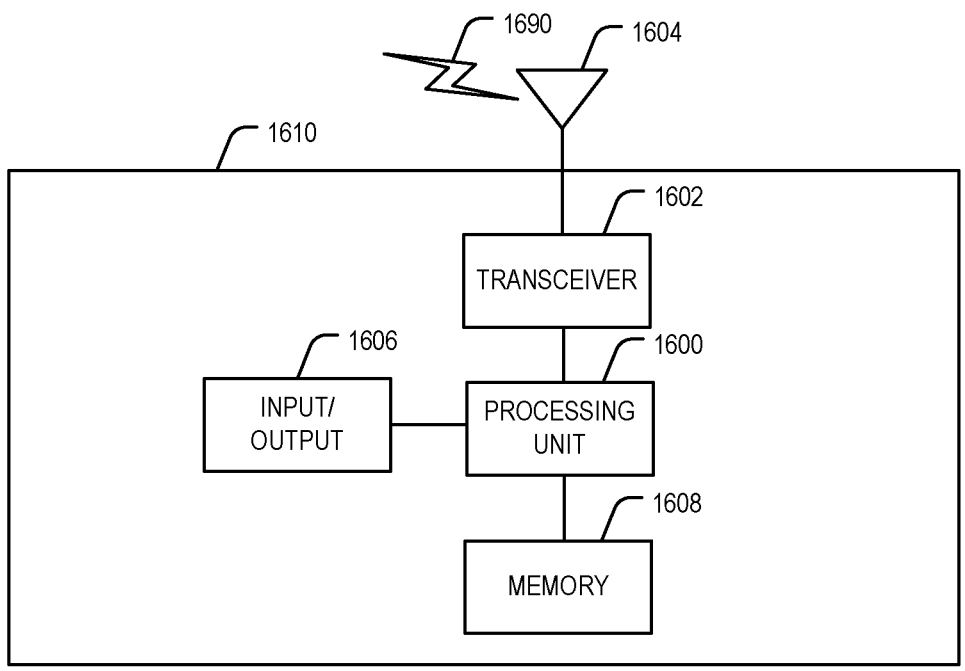
FIGS. 16A and 16B illustrate example devices that may implement the methods and teachings according to this disclosure.
Figure 16B:
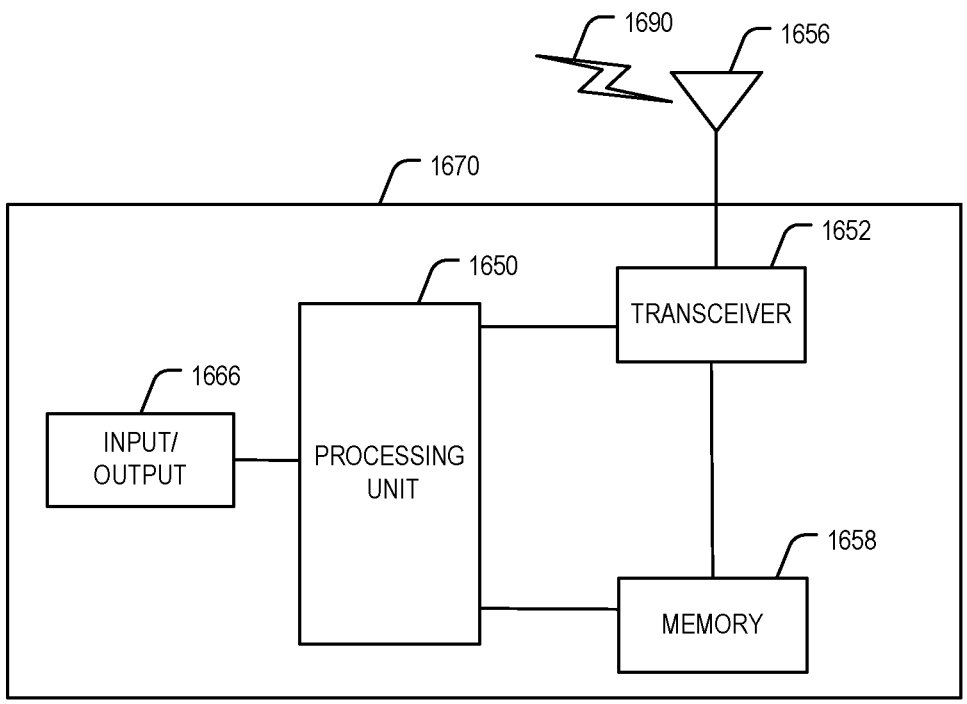

FIGS. 16A and 16B illustrate example devices that may implement the methods and teachings according to this disclosure. In particular, FIG. 16A illustrates an example ED 1610, and FIG. 16B illustrates an example base station 1670. These components could be used in the system 1500 or in any other suitable system.

As shown in FIG. 16A, the ED 1610 includes at least one processing unit 1600. The processing unit 1600 implements various processing operations of the ED 1610. For example, the processing unit 1600 could perform signal coding, data processing, power control, input/output processing, or any other functionality enabling the ED 1610 to operate in the system 1500. The processing unit 1600 also supports the methods and teachings described in more detail above. Each processing unit 1600 includes any suitable processing or computing device configured to perform one or more operations. Each processing unit 1600 could, for example, include a microprocessor, microcontroller, digital signal processor, field programmable gate array, or application specific integrated circuit.

The ED 1610 also includes at least one transceiver 1602. The transceiver 1602 is configured to modulate data or other content for transmission by at least one antenna or NIC (Network Interface Controller) 1604. The transceiver 1602 is also configured to demodulate data or other content received by the at least one antenna 1604. Each transceiver 1602 includes any suitable structure for generating signals for wireless or wired transmission or processing signals received wirelessly or by wire. Each antenna 1604 includes any suitable structure for transmitting or receiving wireless or wired signals. One or multiple transceivers 1602 could be used in the ED 1610, and one or multiple antennas 1604 could be used in the ED 1610. Although shown as a single functional unit, a transceiver 1602 could also be implemented using at least one transmitter and at least one separate receiver.

The ED 1610 further includes one or more input/output devices 1606 or interfaces (such as a wired interface to the Internet 1550). The input/output devices 1606 facilitate interaction with a user or other devices (network communications) in the network. Each input/output device 1606 includes any suitable structure for providing information to or receiving information from a user, such as a speaker, microphone, keypad, keyboard, display, or touch screen, including network interface communications.

In addition, the ED 1610 includes at least one memory 1608. The memory 1608 stores instructions and data used, generated, or collected by the ED 1610. For example, the memory 1608 could store software or firmware instructions executed by the processing unit(s) 1600 and data used to reduce or eliminate interference in incoming signals. Each memory 1608 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station 1670 includes at least one processing unit 1650, at least one transceiver 1652, which includes functionality for a transmitter and a receiver, one or more antennas 1656, at least one memory 1658, and one or more input/output devices or interfaces 1666. A scheduler, which would be understood by one skilled in the art, is coupled to the processing unit 1650. The scheduler could be included within or operated separately from the base station 1670. The processing unit 1650 implements various processing operations of the base station 1670, such as signal coding, data processing, power control, input/output processing, or any other functionality. The processing unit 1650 can also support the methods and teachings described in more detail above. Each processing unit 1650 includes any suitable processing or computing device configured to perform one or more operations. Each processing unit 1650 could, for example, include a microprocessor, microcontroller, digital signal processor, field programmable gate array, or application specific integrated circuit.

Each transceiver 1652 includes any suitable structure for generating signals for wireless or wired transmission to one or more EDs or other devices. Each transceiver 1652 further includes any suitable structure for processing signals received wirelessly or by wire from one or more EDs or other devices. Although shown combined as a transceiver 1652, a transmitter and a receiver could be separate components. Each antenna 1656 includes any suitable structure for transmitting or receiving wireless or wired signals. While a common antenna 1656 is shown here as being coupled to the transceiver 1652, one or more antennas 1656 could be coupled to the transceiver(s) 1652, allowing separate antennas 1656 to be coupled to the transmitter and the receiver if equipped as separate components. Each memory 1658 includes any suitable volatile or non-volatile storage and retrieval device(s). Each input/output device 1666 facilitates interaction with a user or other devices (network communications) in the network. Each input/output device 1666 includes any suitable structure for providing information to or receiving/providing information from a user, including network interface communications.

Figure 17:
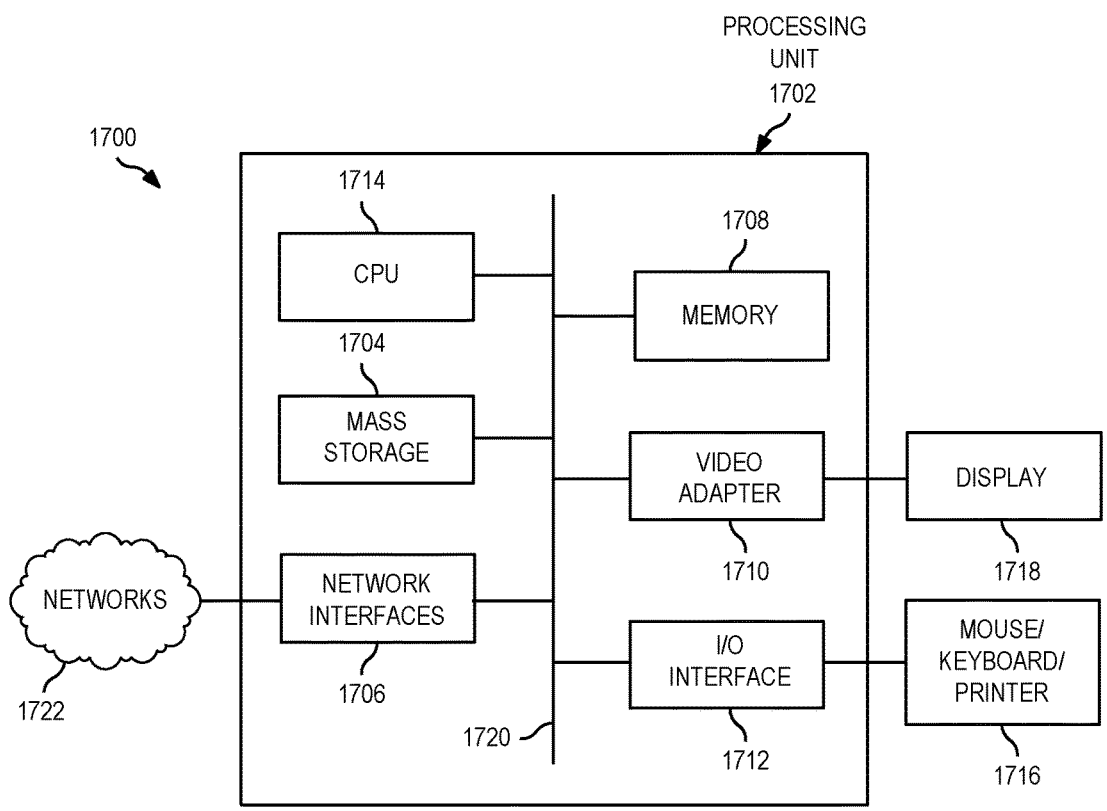
FIG. 17 is a block diagram of a computing system that may be used for implementing the devices and methods disclosed herein.

FIG. 17 is a block diagram of a computing system 1700 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. In an embodiment, the memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse, keyboard, or printer 1716 coupled to the I/O interface 1712. Other devices may be coupled to the processing unit 1702, and additional or fewer interface cards may be utilized. For example, a serial interface such as Universal Serial Bus (USB) (not shown) may be used to provide an interface for an external device.

The processing unit 1702 also includes one or more network interfaces 1706, which may comprise wired links, such as an Ethernet cable, or wireless links to access nodes or different networks. The network interfaces 1706 allow the processing unit 1702 to communicate with remote units via the networks. For example, the network interfaces 1706 may provide wireless communication via one or more transmitters/transmit antennas and one or more receivers/receive antennas. In an embodiment, the processing unit 1702 is coupled to a local-area network 1722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit or module, a calculating unit or module, a storing unit or module, a deriving unit or module, or a providing unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
receiving, by a control plane (CP) from an application function (AF), a traffic influence routing rule comprising a service address representing a destination address of a route to an application server, the traffic influence routing rule specifying a breakout rule for packets of a communicating device addressed to the application server, wherein the breakout rule indicates whether to break out the packets to a local packet data unit (PDU) session anchor (PSA) or forward the packets to a central PSA;
storing, by the CP, the traffic influence routing rule in a policy control function (PCF); and
generating, by the CP, a traffic filter for packets of at least one traffic flow associated with the communicating device, the traffic filter directing the packets of the at least one traffic flow that are addressed to the application server to the service address, the traffic filter being generated in accordance with the traffic influence routing rule.

2. The method of claim 1, the traffic influence routing rule comprising at least one of a traffic influence create rule, a traffic influence update rule, or a traffic influence delete rule.

3. The method of claim 1, the traffic influence routing rule further comprising at least one gateway address associated with the service address.

4. The method of claim 3, the traffic filter comprising the service address and the at least one gateway address.

5. The method of claim 1, the traffic filter being stored in accordance with network slice selection assistance information.

6. The method of claim 1, further comprising:
sending, by the CP to the AF, a traffic influence routing rule response.

7. The method of claim 1, the traffic filter being stored in a unified data repository (UDR).

8. The method of claim 1, storing the traffic filter comprising:
updating an existing traffic filter with the traffic filter.

9. The method of claim 1, the service address comprising an Internet Protocol (IP) address, a port address, and a protocol.

10. The method of claim 1, further comprising:
generating, by the CP, information associated with the traffic filter.

11. The method of claim 10, the information comprising single network slice selection assistance information (S-NSSAI).

12. A method comprising:
receiving, by a policy control function (PCF), a traffic filter for packets of at least one traffic flow associated with a communicating device, the traffic filter comprising a traffic influence routing rule specifying a breakout rule for packets addressed to an application server, wherein the breakout rule indicates whether to break out the packets to a local packet data unit (PDU) session anchor (PSA) or forward the packets to a central PSA;
deriving, by the PCF, a network identifier associated with the traffic filter; and
providing, by the PCF to a session management function (SMF), the network identifier and the traffic filter.

13. The method of claim 12, the network identifier comprising a data network access identifier (DNAI).

14. The method of claim 12, the traffic filter comprising a service address and at least one gateway address.

15. The method of claim 12, the traffic filter further comprising network slice selection assistance information.

16. The method of claim 12, the providing the network identifier and the traffic filter comprising:
initiating a session management policy control service.

17. A control plane (CP) comprising:
a non-transitory memory storage comprising instructions; and
one or more processors in communication with the non-transitory memory storage, wherein the one or more processors execute the instructions to cause the CP to:
receive, from an application function (AF), a traffic influence routing rule comprising a service address representing a destination address as a route to an application server, the traffic influence routing rule specifying a breakout rule for packets of a communicating device addressed to the application server, wherein the breakout rule indicates whether to break out the packets to a local packet data unit (PDU) session anchor (PSA) or forward the packets to a central PSA;
store the traffic influence routing rule in a policy control function (PCF); and
generate a traffic filter for packets of at least one traffic flow associated with the communicating device, the traffic filter directing the packets of the at least one traffic flow that are addressed to the application server to the service address, the traffic filter being generated in accordance with the traffic influence routing rule.

18. The CP of claim 17, the traffic influence routing rule comprising at least one of a traffic influence create rule, a traffic influence update rule, or a traffic influence delete rule.

19. The CP of claim 17, the traffic influence routing rule further comprising at least one gateway address associated with the service address.

20. The CP of claim 19, the traffic filter comprising the service address and the at least one gateway address.

21. The CP of claim 19, the traffic filter being stored in accordance with a network slice selection assistance information.

22. The CP of claim 17, the one or more processors further executing the instructions to cause the CP to:
send, to the AF, a traffic influence routing rule response.

23. The CP of claim 17, the traffic filter being stored in a unified data repository (UDR).

24. The CP of claim 17, the instructions to cause the CP to store the traffic filter including instructions to cause the CP to:
update an existing traffic filter with the traffic filter.

25. The CP of claim 17, the service address comprising an Internet Protocol address, a port address, and a protocol.

26. The CP of claim 17, the one or more processors further executing the instructions to cause the CP to:
generate information associated with the traffic filter.

27. The CP of claim 26, the information comprising single network slice selection assistance information (S-NSSAI).

28. A network function (NF) comprising:
a non-transitory memory storage comprising instructions; and
one or more processors in communication with the non-transitory memory storage, wherein the one or more processors execute the instructions to cause the NF to:
receive a traffic filter for packets of at least one traffic flow associated with a communicating device, the traffic filter comprising a traffic influence routing rule specifying a breakout rule for packets addressed to an application server, wherein the breakout rule indicates whether to break out the packets to a local packet data unit (PDU) session anchor (PSA) or forward the packets to a central PSA;
derive a network identifier associated with the traffic filter; and
provide, to a session management function (SMF), the network identifier and the traffic filter.

29. The NF of claim 28, the network identifier comprising a data network access identifier (DNAI).

30. The NF of claim 28, the traffic filter comprising a service address and at least one gateway address.

31. The NF of claim 28, the traffic filter further comprising network slice selection assistance information.

32. The NF of claim 28, the instructions to cause the NF to provide the network identifier and the traffic filter including instructions to cause the NF to:
initiate a session management policy control service.

33. The method of claim 1, wherein the service address is indicated as an anycast Internet protocol (IP) address corresponding to the AF or multiple unicast IP addresses corresponding to the AF, and wherein a user plane function (UPF) uplink classifier (ULCL) performs breaking out the packets to the local PSA or forwarding the packets to the central PSA.

\* \* \* \* \*